United States Patent
Martin et al.

(10) Patent No.: US 11,949,645 B2
(45) Date of Patent: Apr. 2, 2024

(54) INTELLIGENT TRANSACTION SCORING

(71) Applicant: Clarabridge, Inc., Reston, VA (US)

(72) Inventors: Fabrice Martin, Washington, DC (US);
Ellen Loeshelle, Arlington, VA (US);
Keegan Brenneman, Arlington, VA (US); Ram Ramachandran, Herndon, VA (US); Maksym Shcherbina, Sterling, VA (US); Kenneth Voorhees, McLean, VA (US); Ramy Zulficar, McLean, VA (US)

(73) Assignee: CLARABRIDGE, INC., Reston, VA (US)

( * ) Notice: Subject to any disclaimer, the term of this patent is extended or adjusted under 35 U.S.C. 154(b) by 0 days.

(21) Appl. No.: 18/060,845

(22) Filed: Dec. 1, 2022

(65) Prior Publication Data
US 2023/0101221 A1    Mar. 30, 2023

Related U.S. Application Data

(62) Division of application No. 16/928,397, filed on Jul. 14, 2020, now Pat. No. 11,546,285.
(Continued)

(51) Int. Cl.
*H04L 51/52* (2022.01)
*G06F 40/35* (2020.01)
(Continued)

(52) U.S. Cl.
CPC ............ *H04L 51/52* (2022.05); *G06F 40/35* (2020.01); *G06N 20/00* (2019.01); *H04L 51/18* (2013.01); *H04L 51/42* (2022.05)

(58) Field of Classification Search
CPC ......... H04L 51/52; H04L 51/18; H04L 51/42; H04L 51/234; G06F 40/35; G06F 40/289;
(Continued)

(56) References Cited

U.S. PATENT DOCUMENTS 6,976,031 B1    12/2005  Toupal et al.
8,856,056 B2 *  10/2014  Di Sciullo ............. G06Q 10/04
                                                        706/45
(Continued)

FOREIGN PATENT DOCUMENTS

WO        0052553 A2    9/2000

OTHER PUBLICATIONS

International Search Report and Written Opinion for PCT Application No. PCT/US2021/070483, dated Jul. 29, 2021, 11 pages.
(Continued)

*Primary Examiner* — Soe Hlaing
(74) *Attorney, Agent, or Firm* — Brake Hughes Bellermann LLP

(57) ABSTRACT

Systems and methods provide a flexible environment for intelligently scoring transactions from data sources. An example method includes providing a user interface configured to generate a rubric by receiving selection of one or more one or more conditions, each condition identifying a tag generated by a classifier in the library of classifiers and for each identified tag, receiving selection of a value for the tag that satisfies the condition and receiving selection of an outcome attribute for the condition. The outcome attribute may be a weight for the tag or an alert condition. The method includes storing the rubric in a data store and applying the stored rubric to scoring units of a transaction. The method also includes aggregating scores for transactions occurring during a trend period and displaying the trend score. In some implementations, at least one classifier in the library is a rule-based classifier defined by a user.

20 Claims, 12 Drawing Sheets

Related U.S. Application Data

(60) Provisional application No. 63/017,434, filed on Apr. 29, 2020.

(51) Int. Cl.
*G06N 20/00* (2019.01)
*H04L 51/18* (2022.01)
*H04L 51/42* (2022.01)

(58) Field of Classification Search
CPC ....... G06F 40/30; G06F 40/253; G06N 20/00; G06N 5/041
See application file for complete search history.

(56) References Cited

U.S. PATENT DOCUMENTS

| | | |
|---|---|---|
| 10,162,900 B1 | 12/2018 | Chatterjee et al. |
| 11,763,239 B1 | 9/2023 | Di Prinzio et al. |
| 2008/0126951 A1 | 5/2008 | Sood et al. |
| 2011/0246182 A1 | 10/2011 | Allen |
| 2012/0130771 A1 | 5/2012 | Kannan et al. |
| 2013/0246903 A1 | 9/2013 | Mukai |
| 2013/0262092 A1 | 10/2013 | Wasick |
| 2013/0262320 A1* | 10/2013 | Makanawala ........... H04L 51/52 705/304 |
| 2013/0268534 A1* | 10/2013 | Mathew ................. G06F 16/35 707/740 |
| 2015/0195406 A1 | 7/2015 | Dwyer et al. |
| 2015/0271119 A1 | 9/2015 | Goncalves |
| 2016/0026962 A1 | 1/2016 | Shankar et al. |
| 2016/0092793 A1 | 3/2016 | Garrow et al. |
| 2017/0200234 A1 | 7/2017 | Morse et al. |
| 2017/0213138 A1 | 7/2017 | Bojja et al. |
| 2017/0318035 A1 | 11/2017 | Baughman et al. |
| 2018/0012598 A1 | 1/2018 | Thirukovalluru et al. |
| 2018/0260380 A1 | 9/2018 | Birnbaum et al. |
| 2019/0324981 A1 | 10/2019 | Counts et al. |
| 2020/0082810 A1 | 3/2020 | Kneller et al. |
| 2020/0285683 A1 | 9/2020 | David |
| 2020/0374398 A1 | 11/2020 | Sharma et al. |

OTHER PUBLICATIONS

International Search Report and Written Opinion for PCT Application No. PCT/US2021/070482, dated Aug. 2, 2021, 12 pages.

U.S. Appl. No. 16/928,397, filed Jul. 14, 2020, Allowed.

Hasan, et al., "Why Are You Taking This Stance? Identifying and Classifying Reasons in Ideological Debates", Proceedings of the 2014 Conference on Empirical Methods in Natural Language Processing (EMNLP), Oct. 25-29, 2014, pp. 751-762.

* cited by examiner

Create Rubric

Assign a weight to each category selected from your agent compliance model

| Agent compliance 505 | Criteria condition 510 | Auto-Fail 515 | Weight 520 |
|---|---|---|---|
| Mini-Miranda Disclosure | Detected ▼ | ● | ▒ |
| Masked PII | Detected ▼ | ● | ▒ |
| —Professionalism | | ○ | 72 |
|   Tonality | Detected ▼ | ○ | ● 14 |
|   Clarity | Detected ▼ | ○ | ● 14 |
|   Profanity | Not Detected ▼ | ○ | ● 14 |
|   Readiness | Detected ▼ | ○ | ● 14 |
|   Empathy | Detected ▼ | ○ | ● 16 |
| —Call Transferred? | | | 16 |
|   Informed customer | Detected ▼ | ○ | ● 8 |
|   Timeliness | Detected ▼ | ○ | ● 8 |
| —Branding on closing | | | 12 |
|   Proper closing | Detected ▼ | ○ | ● 12 |

Total 100
Target 80
Trend 70  Period 7

[Test]  [Back] [Save] [Cancel]

INTELLIGENT TRANSACTION SCORING

RELATED APPLICATION

This application is a divisional of, and claims priority to, U.S. application Ser. No. 16/928,397, filed Jul. 14, 2020, which is a non-provisional of, and claims priority to, U.S. Provisional Application No. 63/017,434, filed Apr. 29, 2020, titled "Intelligent Transaction Scoring," the disclosures of which are incorporated herein in their entirety.

BACKGROUND

Business entities have access to various information sources. Analysis of the various sources can make the business more robust and help the entity identify and address problems earlier and more effectively. But due to the amount of information in the sources, it is impractical and inefficient at best, and commonly impossible for humans to perform complete, accurate, and timely analysis.

SUMMARY

Implementations provide a system for real-time analysis of a variety of different information sources to compile complex, multi-dimensional, objective, analysis and to identify desired or undesired trends or occurrences in the information. Specifically, implementations enable an organization to define a customized scoring process that uses a library of classifiers to analyze transactions in various data sources and identify the presence or absence of specified criteria in any transaction. The library can include novel system-provided classifiers, such as an empathy classifier and emotional intensity classifier. The library can also include user-defined classifiers. Implementations also include user interfaces that enable the organization to develop an automated objective scoring process that uses any combination of classifiers in the library of classifiers. Implementations may use the scored transactions for dashboards, graphical representations of the data, identification of conditions that need review, etc. Implementations may include user interfaces that enable the organization to define alert conditions and/or to initiate a process for handling the alerts. The alerts can be triggered by a single transaction or by a trend identified across several transactions, potentially from different data sources. Implementations may also include a feedback loop as part of the alert handling process that can be used as feedback for updating and/or training one or more of the classifiers.

The disclosed techniques described herein can be implemented to realize one or more of the following advantages. For example, an entity may use disclosed techniques to continuously improve an operating model (e.g., how value is delivered to customers) by enabling the entity to use previously unavailable data points as input to a decision process, which can result in faster and/or more accurate decisions. Implementations also enable an entity to work more efficiently and objectively. Implementations provide new data points efficiently and objectively by abstracting and condensing complex and/or specialized information to a single score, which dramatically accelerates and automates key decision-making processes and workflows. Implementations provide a simple, easy to use interface that enables definition of customized weighted criteria for a given data source, enables source selection, and uses disclosed novel classifiers and other classifiers to automatically score any transaction source (calls, chats, messages, tweets, reviews, survey, etc.) in a way that is objective, transparent and consistent. Implementations operate at scale, e.g., analyzing hundreds, thousands, or even millions of transactions every day. Example environments that can benefit from disclosed implementations include, but are not limited to, contact center quality management, compliance/risk management, churn risk assessment, and brand health assessment.

As another example, implementations can be used to create an index across product lines, businesses, etc. to measure emotional reaction to an ongoing topic, event, etc. For example, implementations enable creation of a rubric that generates an "index for" a candidate, a pandemic, a movement, etc. Such implementations may analyze all social media posts related to the topic, event, candidate, etc. and score them according to the defined criteria, including emotional intensity. In the context of a pandemic, such an index may provide an indication of how strongly the public in general is reacting to events and when a return to normal might be predicted.

As another example, implementations enable entities (business entities, government entities, etc.) to continuously improve their operating model (i.e. how they deliver value to customers) by enabling such entities to make decisions faster and more reliably based on previously unavailable data points, as well as to work more efficiently.

BRIEF DESCRIPTION OF THE DRAWINGS

FIG. 5 is a diagram illustrating an example user interface for setting the rubric of an intelligent scoring system, according to an implementation.

FIG. 7 is a diagram illustrating an example interface for viewing an alert queue, according to an implementation.

DETAILED DESCRIPTION

Implementations provide a novel system for intelligently scoring and aggregating data from varied data sources that represent an improvement in the field of data analytics. Implementations have applicability across very different business problems, ensuring consistency and quality across various data sources. Some implementations improve on prior processes that can only evaluate a small sample of transactions and are based on subjective judgments, which can result in an inaccurate overall picture, untimely information, and no objective path for remedy. In contrast, implementations are able to provide a complete picture across multiple landscapes using objective criteria in a timely manner. Some implementations are able to identify actionable alerts in real time based on objective criteria and provide a method for efficient remediation. In addition, implementations can identify specific alert conditions in all (e.g., substantially all, 100%) of the transactions important to an organization, which may result in improved compliance with rules and regulations. Implementations enable an organization to enrich and unify data across many dimensions, to score more (up to 100%) transactions, and score comprehensively, e.g., across channels, business units, direction, etc.

Implementations also include novel classifiers that can be used to support various rubrics. For example, implementations may include an emotional intensity classifier that provides a score indicating the emotional intensity of a transaction scoring unit or an entire transaction. Emotional intensity is not the same as sentiment. For example, constructive criticism (e.g., "you can do better.") can express a negative sentiment without being intense. An emotional intensity classifier does not classify the kind of emotion or sentiment, but rather provides an estimate of whether the speaker exhibits low, medium, or high intensity in what is expressed. In disclosed implementations an emotional intensity classifier can be used to monitor intensity in response to a world event, a company announcement, a political campaign, etc. Implementations enable analysis of transactions at scale, e.g., hundreds of thousands or millions of transactions in a few minutes, which provides near real-time analysis. Such real-time analysis to determine a trend related to intensity represents a new data point not previously available to entities.

Figure 1:
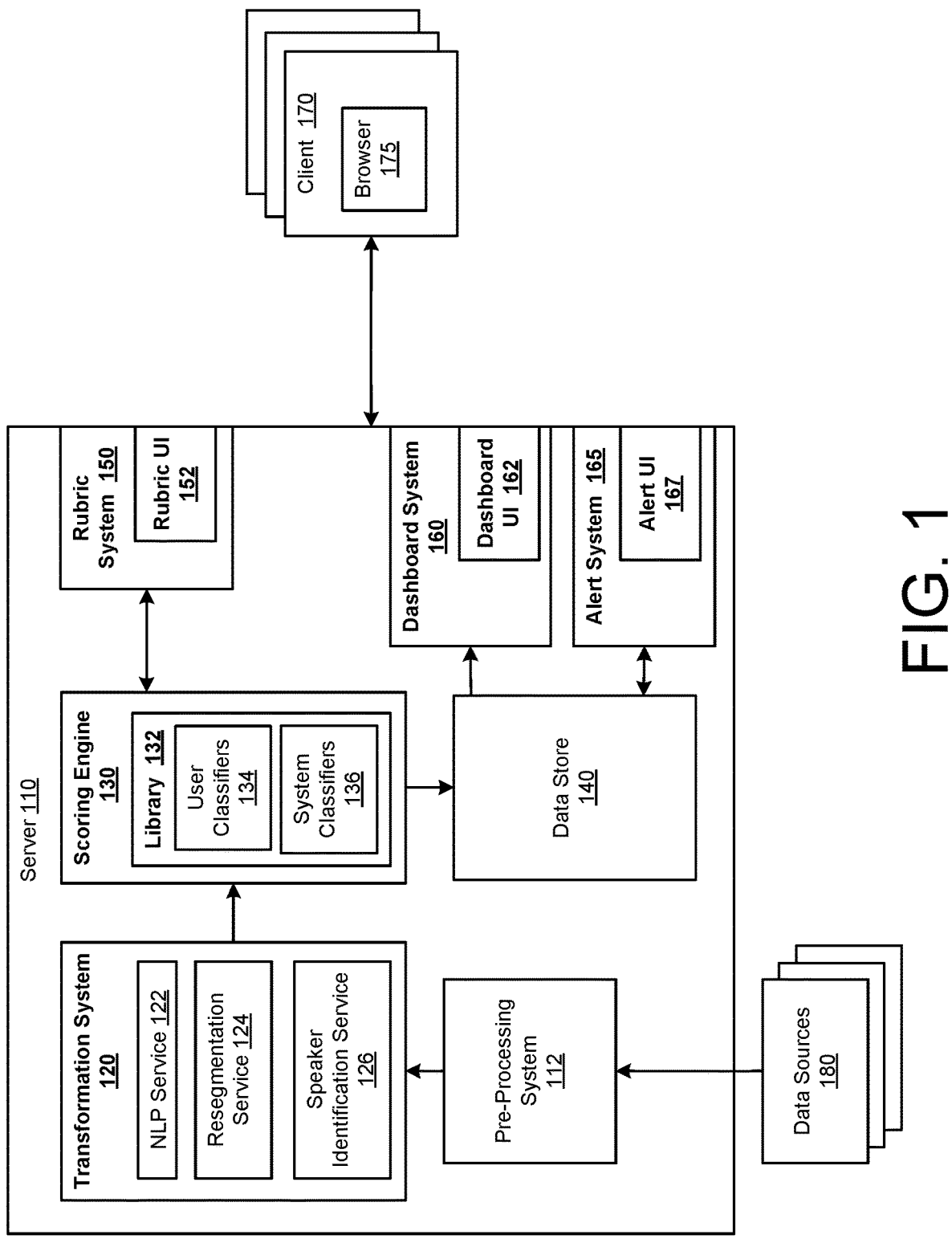
FIG. 1 is a diagram illustrating an example system for intelligent scoring system, according to an implementation.

FIG. 1 is a diagram illustrating an example system 100 for intelligent scoring system, according to an implementation. The example system 100 can be used to enable clients to develop classifiers for intelligent scoring for transactions originating from various data sources, to develop a rubric for automatically scoring the transactions. In some implementations, the rubric may also be used for determining what triggers an alert. The system 100 may trigger an alert based on the scoring of a single transaction or based on a scoring trend, e.g., over several transactions. Transactions can include interactions with a customer, e.g., such as a call-center call, an instant messaging chat, a social media post, a review left by a customer, a survey, an email exchange with a customer, etc. Transactions can also include news article posts or blogs, e.g., those that mention an organization or event. Transactions can include social media posts, including text, audio, or video posts. This list of example transactions is not exhaustive, and implementations cover any transaction that includes data relevant to an event or organization for analysis purposes.

The system 100 includes a server 110. The server 110 is a computer with at least one processor formed in a substrate, one or more operating systems and a memory or memories that store data and/or instructions that cause the server to perform specific operations. The server 110 may be implemented as a distributed computing system. The server 110 may be implemented as a mainframe. The server 110 may be implemented in a logical partition of a computer or computers, e.g., a data center, a mainframe, etc.

The server 110 may have access to data sources 180. Data sources 180 may be part of the server 110. Data sources 180 may be remote from, but accessible by the server 110. Data sources 180 may represent data from various sources, e.g., various social media platforms, data from a call center, data from an email server, data from another server, data from a news feed, etc. Thus, data sources 180 may represent very different types of sources, some of which may be remote and some of which may be local to server 110. In some implementations, the server 110 may access one or more data sources 180 using one or more application program interfaces (APIs) provided by a third party.

The server 110 may include a pre-processing system. The pre-processing system 112 may optionally be used to prepare the data from the data sources 180 for processing. For example, for data sources originating from an audio or video source (e.g., a call center, a short video recording in a social media post, etc.), the data may be transcribed into text. In some implementations, the pre-processing system 112 may include connectors that map attributes of a particular data source to a unified data scheme. The pre-processing system 112 may identify and store one or more attributes for a transaction. A transaction attribute can be any data extracted from or metadata about a transaction. Other similar types of pre-processing may be done by the pre-processing system 112.

The server 110 may include a transformation system 120. The transformation system 120 may be configured to transform the information from the data sources into a format that can be processed by the scoring engine 130. In some implementations, the transformation system 120 is configured to convert large spans of text into component elements. In some implementations, transformation system 120 may include natural language processing (NLP) service 122. The NLP service 122 may use machine learning and rules-based components to execute language detection, tokenization, lemmatization, normalization, morphological analysis, part of speech tagging, named entity recognition, syntax parsing, anaphora resolution, and clause detection tasks against the text associated with one transaction (e.g., a call transcription, an instant message conversation, a social media post). Thus, the NLP service 122 may break (e.g., parse) the text into scoring units. The scoring units may be sentences. The NLP service 122 may tag parts of speech within sentences and/or add other metadata tags. The transformation system 120 may also include resegmentation service 124. The resegmentation service 124 may combine small scoring units (e.g., sentences) into meaningful ones for improved analysis. For example, the resegmentation service 124 may combine the two sentences "okay. I got it." into "okay, i got it". In some implementations, the transformation system 120 may include speaker identification service 126. The speaker identification service 126 may identify a speaker for each component element, e.g., each sentence. Thus, for example, a transaction from a call center may include two participants; an agent and a customer and the speaker identification service 126 may associate each sentence with one of the two participants. Some of the classifiers may be applied only to one type of speaker. In some implementations the functions of the NLP service 122, the resegmentation service 124, and the speaker identification service 126 may be included in a single service or module or may be broken out differently that described with regard to FIG. 1. In some implementations, the transformation system 120 may perform other operations needed to prepare the text of the transaction for scoring, using known or later developed techniques.

The server 110 may include a scoring engine 130. The scoring engine 130 may be configured to analyze the scoring units of the transformed text to look for certain elements. The scoring engine 130 may apply a classifier library 132 to the transformed text. The classifier library 132 may include one or more user-generated classifiers 134. The user-generated classifiers may include rule-based classifiers. A rule-based classifier tests for the presence or absence of a particular condition in the transaction. For example, the user may provide a sentence, a phrase, (and optionally acceptable variants) for the scoring engine 130 to search for in the scoring units of the transformed transaction. In some implementations, the server 110 may include an interface, e.g., rubric UI 152, that enables a user to enter rule-based user classifiers 134. In some implementations the server 110 may include a user interface for training a machine-learned or rules-based user classifier.

The classifier library 132 may include one or more system classifiers 136. The system classifiers may include rule-based classifiers. The system classifiers may include machine-learned classifiers. Example classifiers include a sentiment classifier, a reason detector, an intent detector, effort scoring, an emotion detector, an emotional intensity classifier, an empathy detector, an issue resolution detector, a topic detector, span detection, a profanity detector, a named entity recognizer, etc. In some implementations, named entities may include identifying emails, phone numbers, events, emojis, currencies, units of measure, events, etc. In some implementations, named entities may include products, brands, companies, industries, people, etc. In some implementations, the scoring engine 130 may perform topic analysis. In some implementations, topic analysis, or "categorization", may use Boolean queries, e.g., Lucene-based Boolean queries. In some implementations, a user can define queries based on keywords, phrases, proximity, linguistic relationships or structured data. These queries may represent individual semantic topics that are structured into hierarchical taxonomies. In some implementations, topics may be assigned at the sentence level (e.g., a transaction scoring unit). In some implementations, each sentence can have multiple topics assigned. The scoring engine 130 applies a rubric or multiple rubrics to a transaction. The rubric generates an overall score for a transaction and potentially triggers an alert. The alert may be for a particular transaction or for a trend.

The server 110 may include rubric system 150. Rubric system 150 enables a user, e.g., using client 170, to set categorization queries, generate user classifiers 134, and to define (generate) a rubric against which a transaction or set of transactions are scored. In some implementations, a component of the score may represent a decision on whether something occurring in the transaction needs further attention. The rubric provides a prioritization framework that synthesizes complex rules, represented by the classifiers and weights, as defined by the rubric, into a simple objective score.

Rubric system 150 may include a rubric user interface (UI) 152. The rubric user interface 152 may enable a user to identify criteria for the transactions to be scored by the rubric. For example, the rubric user interface 152 may enable a user to select one or more sources for the transactions, e.g., from data sources 180. The rubric user interface 152 may enable a user to select a subset of transactions from one or more of the data sources 180, e.g., to select only social media posts relating to an event or mentioning a company or customer service calls for customers having a certain status. Such criteria may be referred to as rubric selection criteria. The system may also include a user interface that enables a user to create one or more classifiers. The classifiers may be Boolean queries, e.g., Lucene-based Boolean queries. Such queries search for one or more keywords in a transaction scoring unit and may use wildcard matching and/or proximity matching. The classifier may be a rules-based classifier or a machine learned classifier. Such a user interface may enable a user to provide the query elements for the classifier.

The rubric user interface 152 may enable a user to set the rubric scoring criteria. Rubric scoring criteria represent rules for scoring transactions. For example, the rubric user interface 152 may enable the user to select criteria that uses the output of different classifiers in the classifier library 132. A classifier output used by a rule in a rubric results in that classifier being applied to the transaction scored by the rubric. The rubric user interface 152 may enable a user to link two or more criteria. The rubric user interface 152 may enable a user to use branching criteria. In branching criteria the detection of a condition in the transaction may trigger additional criteria to apply. In some implementations, if the triggering condition is not met, the transaction may lose the points/weight associated with the branch.

The rubric user interface 152 may enable the user to select criterion attributes. An example attribute includes a criteria condition or in other words a rule condition. The condition may be an indication of whether a particular classifier output exists (is detected) or does not exist (is not detected). The rule condition can determine whether a particular outcome (e.g., low intensity or high intensity) identified by the classifier. Thus, implementations provide flexibility in the definition of the rubric. Whether a rule condition is desirable when is detected or when absent may be dependent on the purpose of the rubric. Implementations provide the flexibility to cover various scenarios. Example criterion attributes may also include a weight for the criterion (rule). The weight may represent points given to the transaction/scoring unit if the criterion condition is met. In some implementations, the total combined weight for all scoring criteria cannot be more than a predetermined number, e.g., 100. In some implementations, the weight of linked criteria may be aggregated, e.g., added, averaged, to represent an overall weight for the linked group. Example criterion attributes may include an auto-alert flag. An auto-alert flag may indicate that any transaction that meets the criterion condition triggers an alert. In some implementations, auto-alert criterion may not receive a weight, e.g., no score is given because the criterion is only used for auto-alerts. In some implementations, auto-alert criterion may receive a weight (e.g., may contribute to a score in addition to triggering an alert).

The rubric user interface 152 may also enable a user to select score-based alert conditions. Score-based alert conditions may trigger an alert if a scored transaction fails to meet a target score. Score-based alert conditions may trigger an alert if a single criterion fails to meet a target score. Score-based alert conditions may trigger an alert if linked criteria fail to meet a target score. Score-based alert conditions may trigger an alert if an aggregate score of transactions scored by the rubric over a specified period fails to meet a target score. FIG. 5 is one example of a rubric UI 152, in accordance with disclosed implementations. In other examples, an alert may be used to trigger a workflow and/or to insert data on an external system.

In some implementations, the rubric system 150 may include predictive drivers. Predictive drivers use machine learning to determine the categories and attribute values that have the most impact towards a particular outcome. Thus, the predictive drivers may assist a user in developing a particular rubric. A finalized rubric may be stored so that it can be used by the scoring engine 130.

The scoring engine 130 may use the rubric to score transactions. For example, the scoring engine 130 may apply the rubric criteria to transactions data generated from the data sources 180 to generate rubric data. The rubric data, i.e., the scored transactions, may be referred to as a repository of scored transactions. In some implementations, the server 110 stores transaction data and rubric data in the data store 140. In some implementations, the scoring system stores transaction data at the sentence, verbatim (speaker), and document level in the data store 140. In some implementations, the rubric data may include the outcome of one or more classifiers from the library 132 applied to the transaction and/or transaction scoring units (sentence, paragraph, etc.). The rubric data may include the aggregation of the condition outcomes across a transaction (e.g., a document), where appropriate. Thus, data structures used to store the transaction data and rubric data may be augmented with metadata ingested from the original data source as well as from enrichments provided by the scoring engine 130.

Figure 9:
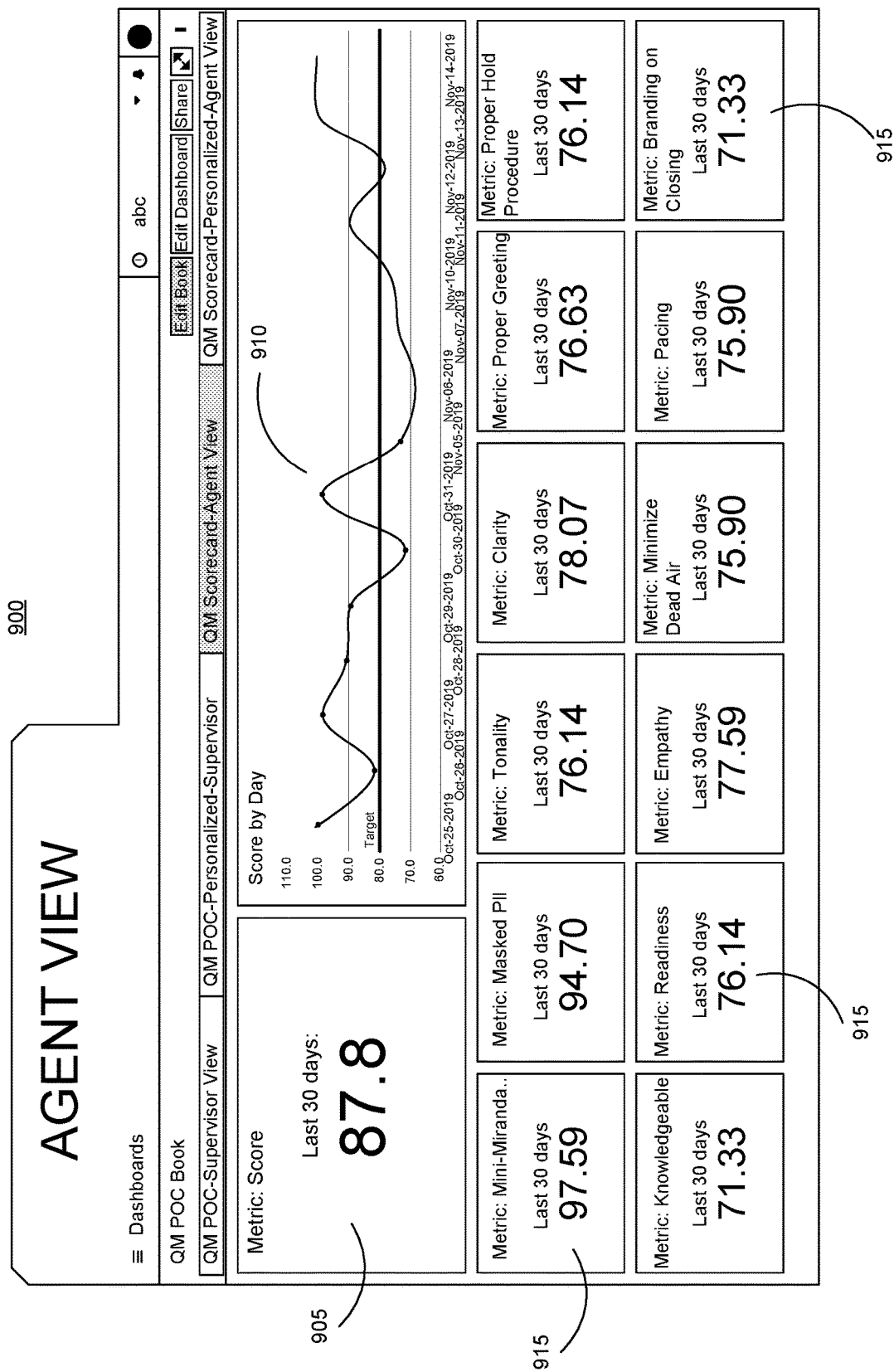
FIG. 9 is a diagram illustrating an example agent dashboard, according to an implementation.
Figure 10:
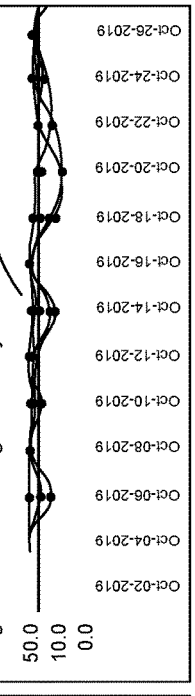
FIG. 10 is a diagram illustrating an example supervisor dashboard, according to an implementation.

The server 110 may include dashboard system 160. The dashboard system 160 may be configured to provide aggregated views of some of the data in the data store 140. As one example, disclosed implementations may provide an aggregated view of rubric scoring for an agent. As another example, disclosed implementations may provide an aggregated view of rubric scoring for all agents under a supervisor. As another example, implementations may provide an aggregated view of rubric scoring across an organization or across a topic or across an event. Some implementations may be integrated with relationship management data, creating organization hierarchies. Such implementations may use the organization hierarchies for dashboard personalization, access management, and engagement. Thus, the dashboard system 160 may include several dashboard user interfaces, collectively represented as dashboard UI 162, that enable users with different roles in the organization access to different aggregated views. FIG. 9 illustrates one example of an aggregated dashboard UI for an agent role. FIG. 10 illustrates one example of an aggregated dashboard UI for a supervisor role. Other user interfaces may present aggregate data for a product line or topic. Such a UI may present scores over a variety of sources (e.g., from customer reviews, from social media posts, etc.). The dashboard system 160 may include other modules or user interfaces configured to enable the organization (e.g., agents and supervisors) to understand aggregate performance, and identify macro trends. Thus, for example, the organization can monitor customer sentiment, remarks, etc. regarding a particular product, the company in general, an advertisement campaign, an event, etc. In some implementations a dashboard UI may present trends in keywords used to describe the organization, a product, an advertising campaign, etc.

Figure 7:
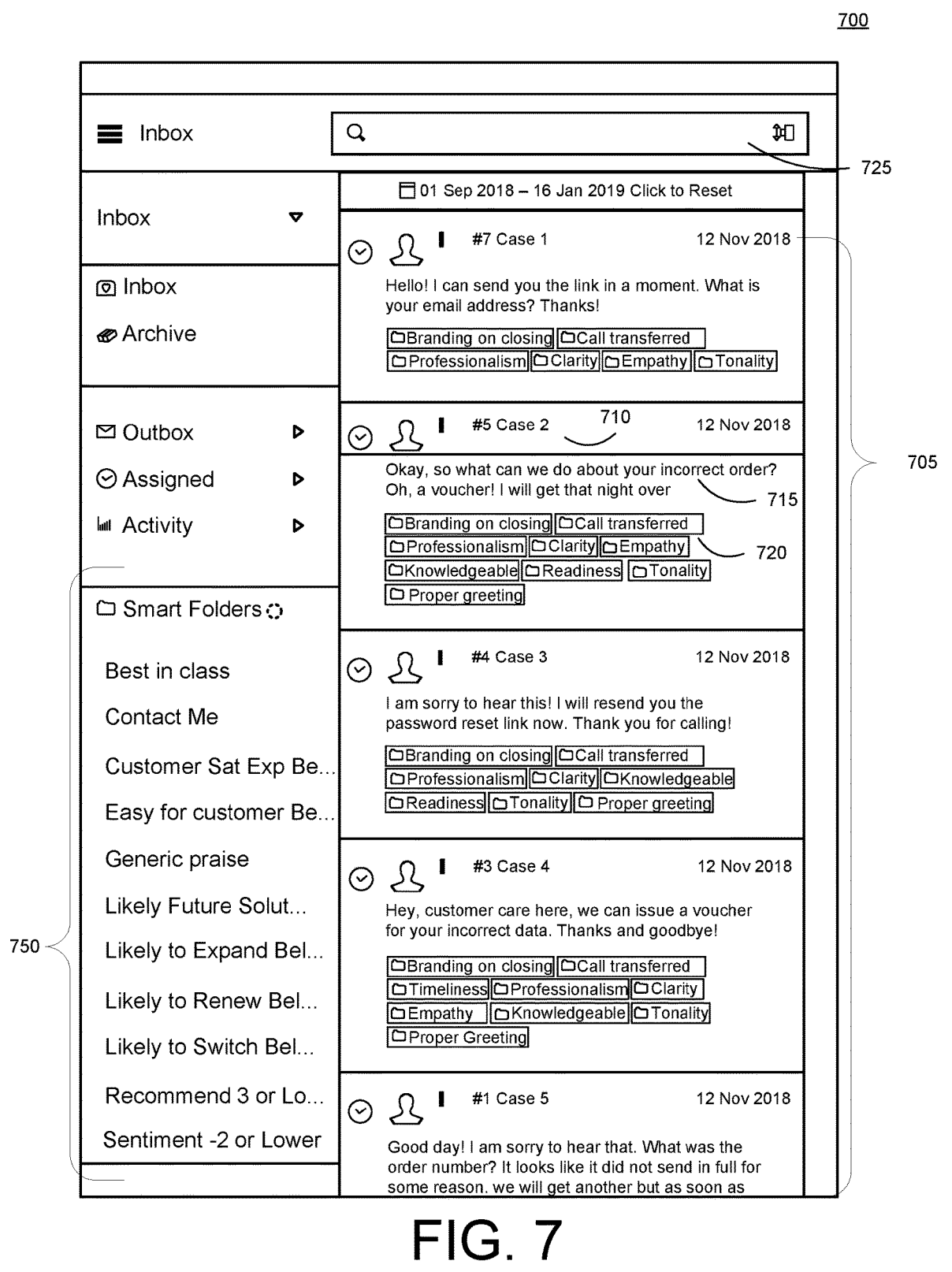
Figure 8:
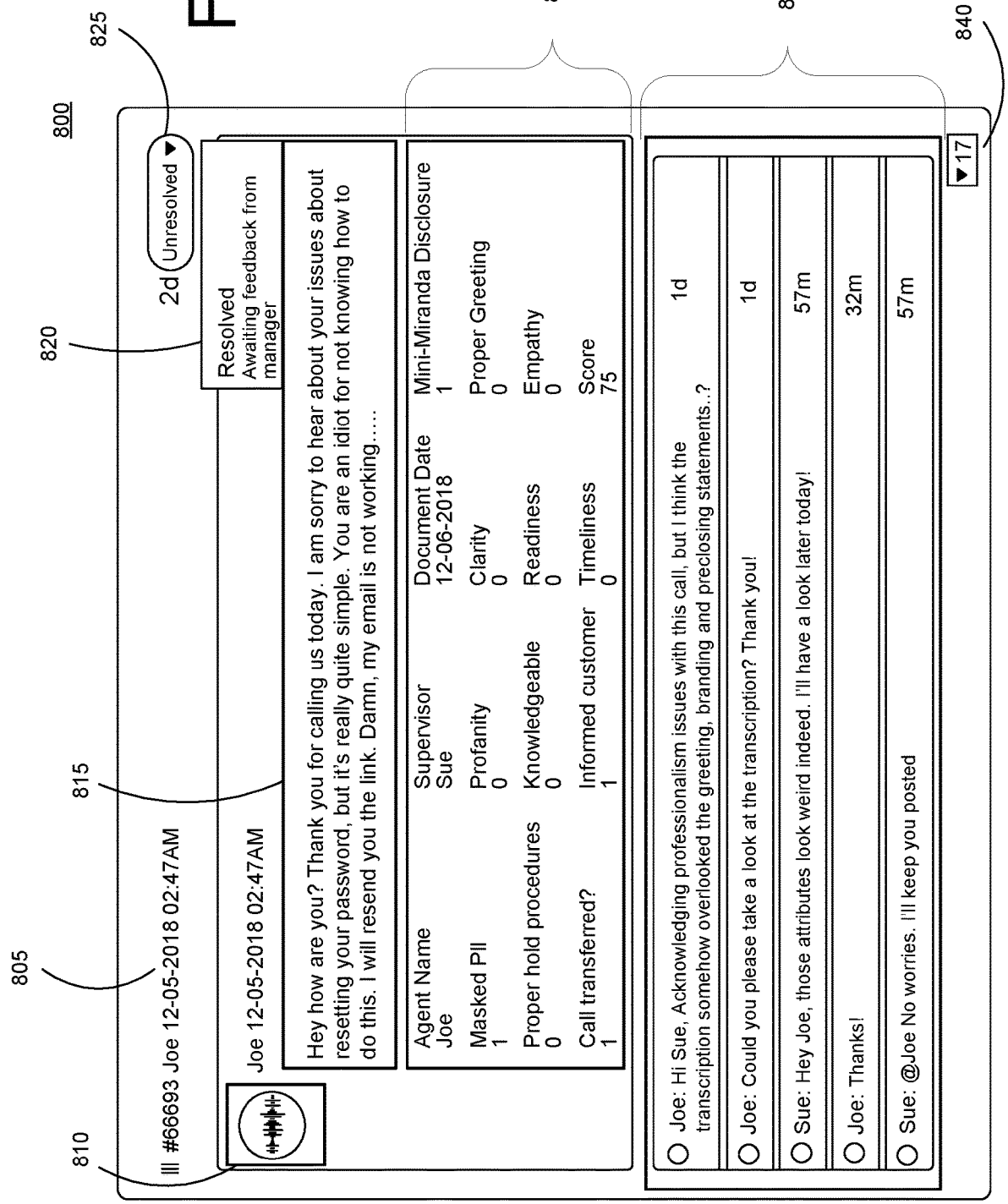
FIG. 8 is a diagram illustrating an example alert coaching interface, according to an implementation.

The server 110 may also include alert system 165. The alert system 165 may be configured to provide real-time alerts that enable an organization to act on problematic trends. The alert system 165 in conjunction with the scoring engine 130 can be configured to provide alerts on individuals (e.g., customers in need, agents needing training) as well as on broader emerging trends. Put another way, in some implementations, the alert system 165 may enable an organization to identify, mitigate, and address various problematic trends earlier and more effectively. The alert system 165 may include one or more user interfaces, collectively represented by alert UI 167. One or more of the alert UI 167 may present a queue of failures, as defined by the user-defined rubric. FIG. 7 represents one example of such a user interface. The queue user interface may include an indication of the summary criteria identified in the transaction, which can help a supervisor prioritize alerts and identify those best handled expeditiously. The alert system 165 may also include a coaching alert UI 167 configured to enable efficient review of a transaction, collaboration on improvements, tracking of collaborations and remedial action. FIG. 8 illustrates one example of a coaching alert user interface. In some implementations, the coaching alert UI 167 or another user interface may enable a supervisor to override a particular score, e.g., for a component in the rubric. For example, a classifier may have incorrectly tagged a scoring unit and this mistake may be discovered during a collaboration, audit, or other review of an alert. The incorrect tag may be marked and saved, e.g., in the data store 140. The server 110 may be configured to use these incorrectly tagged examples to update one or more of the classifiers. For example, for machine-learned classifiers, the incorrectly tagged examples may be used to periodically retrain or update training of the classifier. Thus, the alert system 165 may provide a feedback loop that makes the classifier library 132 more accurate over time. The feedback loop may also include a user interface and process that enables analysts to review the most rebutted classifications and the managers rebutting the classifications.

In some implementations, the alert system 165 may include a trend alert. For example, while one transaction may not, in itself, trigger an alert condition, the transaction may cause a trend alert condition, e.g., a rolling average of the overall score of a set of transactions meets (e.g., falls below or exceeds) some threshold. The alert system 165 (and/or the scoring engine 130) may enable a user to set a trend alert, identifying the particular rubric score to track.

Figure 11:
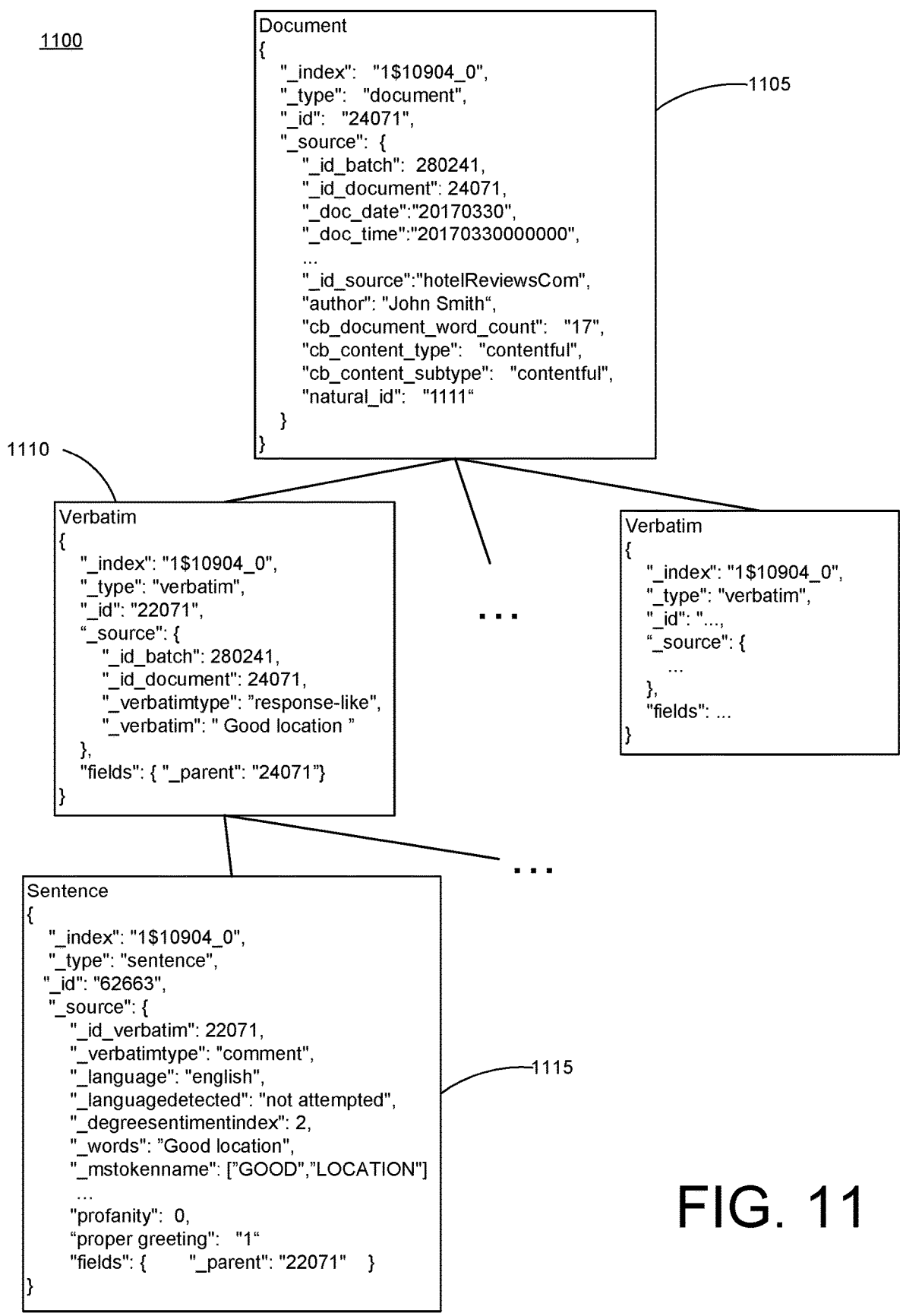
FIG. 11 is a diagram illustrating an example record in a transaction scoring data structure, according to an implementation.

The server 110 may include data store 140. Data store 140 represents a memory or memories storing data structures that support the functionality of the various components of server 110. The data store 140 may represent several different data structures. In some implementations, some of the data structures in the data store 140 may be remote from, but accessible by, the server 110. In some implementations, one or more of the data structures may be distributed data stores. In some implementations, one or more of the data structures may support customer relations management (CRM) functions. FIG. 11 is one example of data structures that may be included in data store 140 to support intelligent scoring in a customer service environment.

One or more of the elements of the server, such as pre-processing system 112, transformation system 120, scoring engine 130, rubric system 150, dashboard system 160, and/or alert system 165, may be implemented as software, hardware, firmware, or a combination of these. Further, although illustrated as part of server 110, one or more of the elements may be performed by another computing system communicatively connected to the server 110. Thus, implementations include arrangements not specifically illustrated in FIG. 1. Additionally, while a call center has been used for ease of discussion to describe an environment for the server 110, this is only one example environment and implementations include any environment that enables users, e.g., of client 170, to generate and customize classifier library 132 and a scoring rubric for transactions.

The system 100 may also include one or more clients 170. The client 170 represents a personal computing device, such as a PC, a laptop, a tablet computer, a smart phone, a smart television, a wearable device, etc. A user may use the client 170 to access the user interfaces provided by the server 110. For example, the client 170 may include a browser 175 that enables the user, via client 170 to receive information from the server 110 and to provide information to the server 110. The client 170 and the server 110 may communicate over a network, such as the Internet or an intranet.

Figure 2:
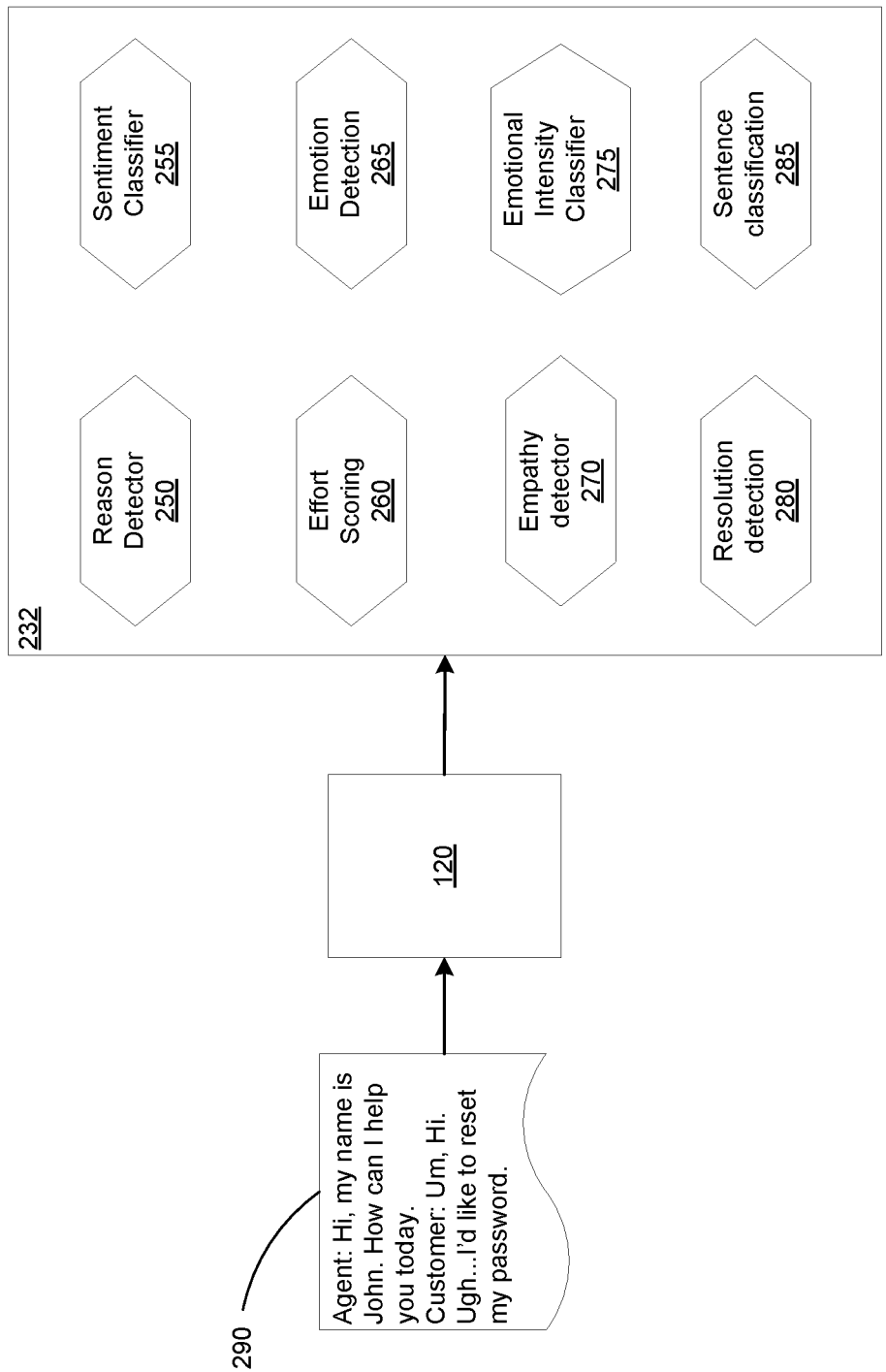
FIG. 2 is a diagram illustrating classifiers in an example library used by an intelligent scoring system, according to an implementation.

FIG. 2 is a diagram illustrating classifiers in an example classifier library 232 used by an intelligent scoring system, according to an implementation. The classifier library 232 of FIG. 2 is one example of classifier library 132 of FIG. 1. In addition, FIG. 2 illustrates an example transaction 290 from a data source. In some implementations, the classifier library 232 operates on hundreds, thousands, or even millions of such transactions on a daily basis. Thus, classifiers in the classifier library 232 need to operate at scale and cannot practically be performed by a human. In the example of FIG. 2 the transaction 290 is a customer call to an entity's call center. The transaction 290 is processed, e.g., by the transformation system 120 of FIG. 1, to identify scoring units. In this example, the scoring units are sentences from the call. The scoring units are each associated with one of two verbatims, Agent or Customer. Some classifiers may only apply to certain verbatims, e.g., an empathy detector may only be applied to the Agent's verbatims. Even if a classifier is applied to every scoring unit, some rubrics may only use the score from scoring units for certain speakers, e.g., a sentiment classifier may be applied to all scoring units but only used in a particular rubric to identify the presence of satisfaction/positive sentiment.

The classifier library 232 of FIG. 2 includes several example classifiers. A reason detector 250 may tag a scoring unit with one or more of several predefined reasons. In some implementations, the reason detector 250 may include a Boolean query, e.g., looking for certain keywords or combinations of keywords, which may or may not be in proximity to each other or to other keywords. In some implementations, one or more reason detectors 250 may be user-defined. In some implementations, one or more reason detectors 250 may be machine learned. An example rubric may look for the presence or absence of specific reasons. In some implementations, a rubric may only be applied to transactions tagged with prespecified reasons. In some implementations, the presence of a particular reason may be a branching criterion in the rubric.

The classifier library 232 may include a sentiment classifier 255. The sentiment classifier 255 may tag a scoring unit with one or more sentiment tags. In some implementations, a sentiment tag may indicate positive sentiment or negative sentiment. In some implementations, A rubric may score the presence or absence of a particular sentiment or may be applied only to transactions that include a specific sentiment. The classifier library 232 may include an emotion detection classifier 265. The emotion detection classifier 265 may tag a scoring unit with one or more predefined emotions, e.g., anger, frustration, gratitude, etc. In some implementations the emotion detection classifier 265 may tag a scoring unit as either expressing or not expressing an emotion. In some implementations the effort scoring classifier may be a machine-learned classifier. The effort scoring classifier 260 may tag a scoring unit with one or more predefined effort tags. The effort tag may represent how hard/frustrating or how easy/enjoyable a speaker found a task, an interface, a process, etc. Such as tag can be used to score/analyze customer reaction to a workflow, website, customer service process, etc. In some implementations, the tag may be a numeric score, e.g., ranging from zero to 10 or ranging from −5 to +5, etc. In some implementations, a numeric tag may be used in conditional or branching criteria. For example, in a rubric a transaction found to include high effort on the part of a customer may trigger conditional criteria, e.g., criterion evaluating apology or increased empathy.

The classifier library 232 may include an empathy detector 270. An empathy detector 270 may tag a scoring unit as expressing empathy. In some implementations this may be a machine learned classifier. In some implementations the empathy detector 270 may tag a scoring unit as either expressing empathy or not expressing empathy. In some implementations, only scoring units associated with a particular speaker (e.g., an agent rather than a customer) may be analyzed by the empathy detector 270.

The classifier library 232 may include an emotional intensity classifier 275. An emotional intensity classifier 275 may give a score indicating how strong an emotion is, irrespective of the actual emotion expressed. In some implementations the emotional intensity classifier 275 tags a scoring unit as having low intensity, medium intensity, or high intensity. The emotional intensity classifier 275 may be a machine learned classifier. In some implementations, the emotional intensity classifier 275 may be trained on curated training data. The curated training data may be labeled as either including an emotion and, if labeled as including an emotion, the training data may further be labeled as either intense or not intense. The emotional intensity classifier 275 may have a confidence level associated with whether the classification is intense or not intense. In some implementations, when the trained model is used at inference, the confidence level may be used to determine whether a scoring unit is scored as having low, medium or high intensity. For example, a high confidence that the scoring unit is intense may result in the scoring unit being considered high intensity. A low confidence that the scoring unit is intense may result in the scoring unit being considered low intensity. A confidence score in a middle range may result in the scoring unit being considered medium intensity. The emotional intensity classifier 275 may enable the system to track intensity related to a particular topic, event, interaction, etc. In some implementations the emotional intensity classifier may be useful for identifying how intensely people react to a movie by analyzing social media posts referencing the movie, how strongly people feel about a movement (e.g., a protest), etc.

The classifier library 232 may include a resolution detection classifier 280. A resolution detection classifier 280 may be a machine-learned classifier trained to indicate whether or not a transaction includes remaining actions, e.g., for either a customer or an agent. If any participant in the transaction has a follow-up item, the transaction is not resolved. The classifier library 232 may include one or more sentence classifiers 285. A sentence classifier 285 may tag a scoring unit as one or more types of predetermined sentence types. For example, one sentence classification may tag a sentence as including a mini Miranda warning and/or as including a proper greeting, etc. One or more of the sentence classifiers 285 may be set up/generated by the user. The classifiers illustrated in library 232 are examples of the various types of classifiers that may be included in disclosed implementations and implementations can include other types of classifiers.

Figure 3:
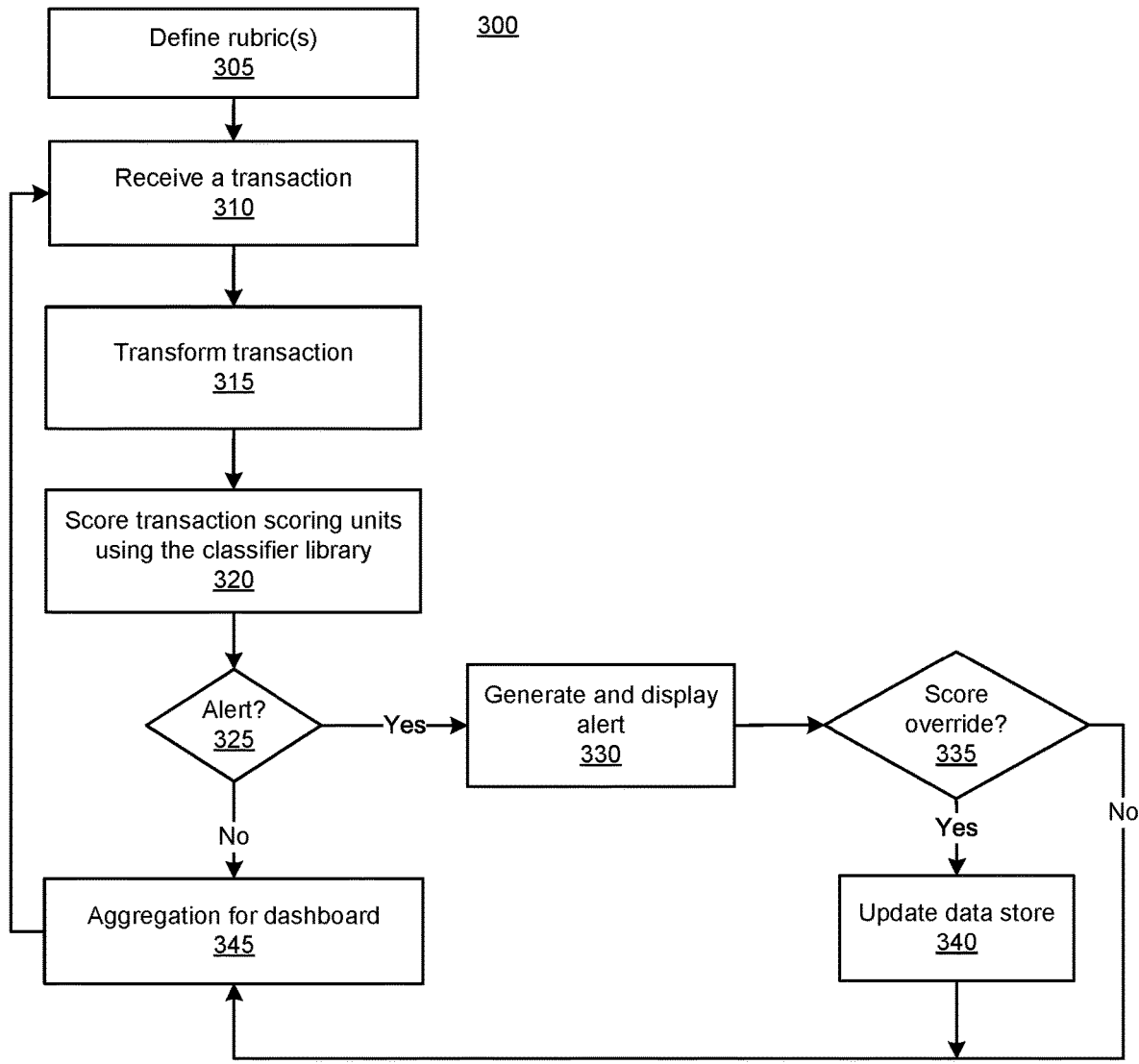
FIG. 3 is a flow diagram illustrating an example process for intelligently scoring transactions and initiating an alert workflow that includes a feedback loop, according to an implementation.

FIG. 3 is a flow diagram illustrating an example process 300 for intelligently scoring transactions and initiating an alert workflow that includes a feedback loop, according to an implementation. Process 300 may be performed by an intelligent scoring system, such as system 100 of FIG. 1.

Figure 4:
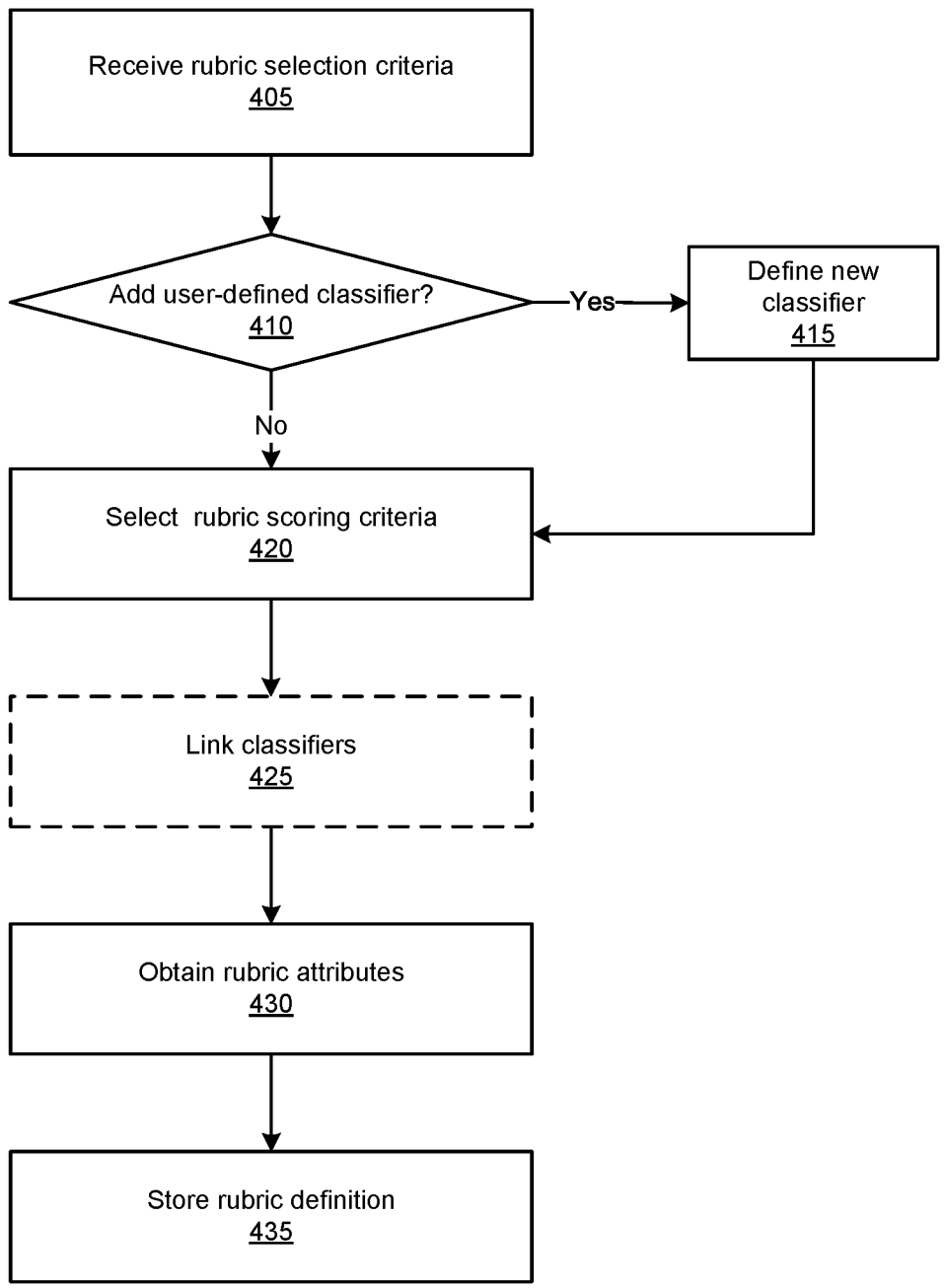
FIG. 4 is a diagram illustrating an example process for establishing a rubric, according to an implementation.

Process 300 begins with a user defining a rubric or multiple rubrics (305). A rubric may apply to a specific transaction source. A rubric may apply to several transaction sources. A rubric may apply to transactions found to include a specific tag, e.g., from one of the classifiers. A rubric may apply to transactions found to mention or include references to selected keywords, terms, hashtags, etc. In other words, a rubric may apply to a specific type of transaction and/or may apply to a transaction tagged with a particular tag. As part of defining the rubric, the user may provide one or more classifiers. FIG. 4 illustrates an example process for defining a rubric. FIG. 5 is a diagram illustrating an example user interface for setting the rubric of an intelligent scoring system, according to an implementation. A rubric must be defined before it can be used to score transactions, but defining and updating rubrics is otherwise independent from the remainder of process 300.

Once at least one rubric is defined, the system may begin applying the rubric to transactions. Accordingly, the system may receive a transaction (310). The transaction can be from any data source. Example transactions include a survey response, a social media post, a customer review, an instant message chat session, a call transcript, an email chain, a record from a customer relations database, a news article, a blog post, etc. In some implementations, the transaction may meet some selection criteria for the rubric source. For example, a rubric may be applied only to transactions for customers who have signed up for a loyalty program, or a rubric may be applied only to transactions that include specified hashtags or mention certain words or phrases (including lemmatization or stemming of the words or phrases). For the purposes of process 300 the transaction is assumed to meet any such rubric selection criteria.

The system may transform the transaction (315). As part of transforming the transaction, the system may identify scoring units. In some implementations, a scoring unit represents a span of text, such as a sentence or paragraph. A scoring unit may be any data on which a classifier in the classifier library operates. In some implementations, different classifiers may operate on different scoring units. For example, some classifiers may operate on a sentence and another classifier (e.g., a timeliness classifier that tags a transaction as being timely or not timely) may operate on the overall transaction. Transforming the text may also include resegmenting some of the text. Resegmentation may combine small scoring units into larger scoring units for improved analysis. Transforming the text may also include speaker identification, where a transaction includes more than one speaker. Speaker identification service associates a speaker for each scoring unit. Speaker identification can be a generic role identification, e.g., "customer" or can identify a specific employee, agent, contractor, etc.

The system may apply one or more classifiers from the classifier library to the scoring units and score the transaction according to the rubric (320). The classifiers applied to a transaction may be based on the rubric definition. Whether a rubric applies to a particular transaction is based on rubric selection criteria. A transaction may be scored by more than one rubric, in some implementations. In some implementations, application of classifiers may be done in an intelligent manner. For example, only classifiers used in a rubric condition may be applied and/or if a rubric includes conditional logic (branching), the classifier controlling the condition may be applied first and additional classifiers may be applied if the branching condition is satisfied. In some implementations, all classifiers in the library may be applied to the transaction. Some classifiers may only apply to scoring units for a certain speaker (e.g., to sentences associated with a "customer" role or to sentences not associated with a "customer" role).

Application of the classifiers results in at least some of the scoring units receiving one or more tags. A tag may indicate the type, class, topic, presence of an attribute, absence of an attribute, etc. In some implementations, the system may aggregate some of the scoring units for a transaction. For example, if one or more scoring units associated with an agent are tagged as including profanity, the entire transaction may be tagged as including profanity. The system applies the rubric against the transaction, or in other words determines which rule conditions are satisfied and applies the scoring and alerts indicated by the rule. The rubric may provide a weight or score for the presence or for the absence of one or more tags in the scoring units for the transaction. The rubric may include conditional scoring, e.g., branching. The system may calculate an overall score for the transaction, e.g., based on the weights. The rubric provides the instructions for scoring, i.e., which classifiers (tags) are scored and how they are scored. Thus, the system provides flexibility in scoring various parts of a transaction, transactions from various data sources, etc. The rubric may provide a threshold score for the transaction. The system may store the tagged transaction, i.e., the rubric applied to the transaction. For example, a record in a data store may store the tags applied to the transaction and/or to one or more of the scoring units. In some implementations, the system may store the score calculated by the applied rubric. The scored transactions, e.g., scored according to the rubric, may be stored for later dashboard reporting and/or trend analysis.

In some implementations, the system may determine whether the rubric scoring indicates an alert condition (325). Implementations include various alert conditions. As one example, the rubric may indicate the presence (or absence) of one or more tags automatically trigger an alert. Thus, the alert condition may be satisfied by the presence or absence of a particular tag in the scoring units for the transaction. The alert condition may be satisfied by an overall score for the transaction failing to meet a threshold. In some implementations, the rubric may provide that threshold. If any transaction scored by the rubric fails to meet the threshold, the system may trigger an alert for that transaction. As another example, an alert condition may be triggered as a result of a trend analysis. Such trend analysis can take place after each transaction is scored or periodically (e.g., every minute, hourly, daily, weekly, etc.), the period being dependent on implementation settings. In trend analysis, the rubric may include a target score and a trend period. If the aggregated score (e.g., average, mean, etc.) of transactions scored during the period to which the rubric applies falls below (or goes above, depending on the implementation) the target score, the rubric scoring indicates an alert condition. In trend analysis, the alert may be triggered for the rubric selection criteria generally, rather than for an individual transaction. In some implementations, the system may enable a user to define trend selection criteria. Trend selection criteria enables the system to identify an aggregate between transaction and the rubric selection criteria. For example, a rubric may score individual transactions and the trend selection criteria of the rubric may indicate that a trend alert occurs at the agent level. In other words, although the system scores all transactions to which the rubric applies, an alert may be generated periodically when the aggregate score for transactions associated with a particular agent matches the alert condition (e.g., an average score over 7 days falls below a target). In this example, a subset of transactions subject to the rubric selection criteria are considered in determining whether a trend meets alert criteria.

If the system finds the rubric scoring indicates an alert condition (325, Yes), the system may generate the alert (330). In some implementations, this may cause an alert record to be put into an alert queue. FIG. 7 is an example of a user interface displaying an alert queue. In some implementations, the system may generate an alert message (e.g., email, SMS, app notification, etc.). In some implementations, the system may write a record to an alert log. The system may also include an interface used to display an individual alert. In such an implementation, the system may provide an interface for updating the scoring of an individual transaction. For example, after reviewing the transaction and the tags applied, a user may determine that one or more tags do not apply to the particular transaction. The system may provide an interface that enables the user to indicate which tag is in error and to provide a corrected tag. In some implementations, the system may include a coaching interface. A coaching interface may be an example of an interface for displaying an individual alert. FIG. 8 is a diagram illustrating an example alert coaching interface, according to an implementation.

In implementations that include an interface for editing the tags of a transaction, e.g., enabling a user to override one of the rubric conditions, when a user does override a rubric tag (335, Yes), the system may track the edits by updating the data store (340). For example, a tag may be removed from, added to, or changed in a transaction or one of the transaction's scoring units. This edit may be tracked by the system and used as feedback for improving the library of classifiers. This can include review of the scoring unit and transaction by a human rater but may also include using the change as a training example for further training of a classifier. For example, the edit may be used to update (e.g., retrain) the classifier that produced the incorrect tag. The edit may be used to manually tweak the criteria of a user-defined classifier that produced the incorrect tag. This feedback loop enables some implementations to provide more accurate scoring over time.

The system may also provide various dashboard interfaces that aggregate the scored transactions for presentation (345). The various dashboard interfaces may relate to various levels of aggregation. For example, FIG. 9 is a diagram illustrating an example agent dashboard (e.g., aggregation of transactions associated with a particular agent) and FIG. 10 is a diagram illustrating an example supervisor dashboard (e.g., aggregation of transactions associated with agents under a particular supervisor). Implementations may include other dashboards, including a dashboard that illustrates an aggregated view for all transactions scored by a particular rubric over a particular time period, Implementations may include other dashboards, e.g., aggregating transactions by topic, by event, or by any other criteria relating to the scored transactions. Process 300 may include repeating steps 310 to 345 as needed to process transactions. Moreover, although process 300 illustrates the operations in sequential order, it will be appreciated that this is merely an example, and that additional or alternative operations may be included. For example, process 300 may score several transactions in parallel, may apply several rubrics in parallel, and/or determine alerts in parallel. Further, operations of FIG. 3 and related operations may be executed in a different order than that shown, or in overlapping fashion.

FIG. 4 is a diagram illustrating an example process 400 for establishing a rubric, according to an implementation. Process 400 may be performed by an intelligent scoring system, such as system 100 of FIG. 1. Process 400 is one example of defining a rubric as part of step 305 of FIG. 3. Process 400 begins with a user setting rubric selection criteria (405). The rubric selection criteria may include identification of a data source or multiple data sources. In some implementations, no data sources are identified and it is assumed that the rubric applies to transactions from any data sources the system processes. The rubric selection criteria may include identification of attributes or characteristics that a transaction from an identified data source must have. For example, rubric selection criteria may identify text, such as keywords, terms, hashtags, etc. (including stems and/or lemmatizations), that appear in a transaction from a selected data source. Thus, for example, a rubric may apply to social media posts mentioning a specific product, company, event, hashtag, etc. The rubric selection criteria may identify attributes of a speaker of the transaction. For example, a customer contacting a help desk may identify as being from a certain company or may provide a member number. Implementations may be able to identify transactions from members with certain characteristics, e.g., a platinum level member, etc. The rubric selection criteria may identify a particular tag. For example, the rubric selection criteria may indicate that the rubric applies to transactions tagged as including a particular reason, e.g., from reason detector 250. In some implementations the rubric selection criteria is optional, e.g., all transactions are processed, regardless of data source or content.

As part of defining the rubric, the user may use any combination of classifier output, including newly defined classifiers. Accordingly, in some implementations, a user may indicate a new classifier is needed (410, Yes). The system may provide the user with the opportunity to define the new classifier or multiple new classifiers (415). Such new classifiers may be saved, e.g., in a classifier library. In some implementations, adding a new classifier may include providing a model, i.e., a trained machine-learned classifier. The system may then enable the user to identify rubric scoring criteria (420). A rubric scoring criterion is a rule with a condition that uses a classifier tag, a value for the tag that satisfies the condition, and an outcome attribute if the condition is satisfied. The rubric may include many scoring criteria. The tag used by the rule condition may also be referred to as a category. Each tag (category) is associated with a classifier. In other words, the category represents the classifier that generates the tag. The value that satisfies a rule condition may indicate a presence or absence of a tag. Thus, for example, one rubric scoring criterion may look for the absence of a profanity tag, while another rubric scoring criterion may look for the presence of an emotional intensity tag. The value of a tag in a rubric scoring criterion may be one of two or more potential values for a tag. For example, an emotional intensity tag scoring criterion may look for a value of "low," "med," or "high." The outcome attribute of a rubric scoring criterion may be a weight or score. The outcome attribute of a rubric scoring criterion may be an alert condition. The outcome attribute of a rubric scoring criterion may be a branching instruction. A branching instruction triggers application of at least one additional scoring criterion. In some implementations, rubric scoring criteria may be subject to linking (425). For example, two or more rubric scoring criteria may be linked together in a group. When the outcome attribute is a score, the group may receive an aggregate of the scores for the component criteria. The aggregate can be a sum, an average, a mean, etc. Linked scoring criteria may be given a group label (e.g., entered by the user) and a dashboard can show the aggregated score for the group. Linked scoring criteria may have an auto condition as an outcome attribute. Linked scoring criteria can be branching criteria, or in other words have a branching instruction as the outcome attribute.

The system may obtain other rubric attributes, such as a target score, a trend alert score, a trend period, a rubric name, etc. (430). The system may store the rubric selection criteria, the rubric scoring criteria, any linked criteria, and the rubric attributes in a rubric definition (435). Once stored, the system may begin applying the rubric to transactions. Process 400 may be used to define any number of rubrics. Moreover, although process 400 illustrates the operations in sequential order, it will be appreciated that this is merely an example, and that additional or alternative operations may be included.

FIG. 5 is a diagram illustrating an example user interface 500 for defining rubric scoring criteria in an intelligent scoring system, according to an implementation. The example user interface 500 of FIG. 5 provides an example of a call center agent compliance rubric and is presented for illustration purposes only; implementations are not limited to call center rubrics or to the specific scoring criterion illustrated. User interface 500 demonstrates the flexibility disclosed implementations provide in distilling complex and/or specialized information to a single score. The user interface 500 may include categories 505, tag values 510, and outcome attributes represented by auto-alerts 515 and weights 520. The auto-alerts 515 illustrated in FIG. 5 are binary; if this outcome attribute is selected then the system sends an alert when the system fails to detect/find a transaction with the category and the tag value indicated in the scoring criterion. The weights 520 represent a score assigned to an individual scoring criterion. In some implementations, the auto-alerts 515 outcome attribute and the weight 520 attribute are mutually exclusive, e.g., a scoring criterion can have either an auto-alert value or a weight attribute, but not both. In some implementations, the auto-alerts 515 outcome attribute and the weight 520 attribute can be present for a single scoring criterion. Thus, for example, if a mini-miranda disclosure is not detected the system may determine an alert condition is present but if a mini-miranda disclosure is detected the system may score the mini-miranda criterion with the indicated score.

The user interface of FIG. 5 illustrates multiple rubric scoring criteria 550. In the example of FIG. 5, the scoring criteria 550 include a mini-miranda disclosure category, a masked PII category, a tonality category, a clarity category, a profanity category, a readiness category, a call transfer category, an informed customer category, a timeliness category, and a proper closing category. Other categories may be included in the rubric, as indicated by the scroll bar. The user interface 500 may be configured to enable the user to add additional categories by selecting additional classifier tags available from the library of classifiers. The user interface 500 includes linked criteria 565. Linked criteria 565 in the example of FIG. 5 include a group label of "Professionalism." The weights for the categories included in the Professionalism group are aggregated. For example, in FIG. 5 the weights 520 of the categories included in the Professionalism group are aggregated by addition. Thus, the weight for the professionalism group is a sum of the weights for the categories included in the professionalism group. Implementations include other types of aggregation, e.g., average, mean, etc.

The user interface 500 includes branching criteria 570. Branching criteria 570 represents a linked group of scoring criteria, e.g., the informed customer category and the timeliness category, that are only scored if the branching criteria is met. In this example, the branching criteria is the detection of a call transfer. The user interface 500 is configured to obtain rubric attributes, such as the target score 525, a trend alert score 530, and/or a trend period 535. The trend alert score 530 and the trend period 535 may be used to define an alert condition related to trend analysis. For example, if the average score of scored transactions over 7 days falls below 70, the rubric of user interface 500 may trigger an alert. In some implementations, an alert condition is implied based on the target score 525. For example, a transaction score that is some predetermined amount below the target score 525 (e.g., 10 below, 10% below, etc.) will trigger an alert. Some implementations may include a test control 590. The test control 590 may provide a method for validating and testing the rubrics before the actual scoring. For example, the method may include selecting a random sample of transactions (e.g., up to 100, 1000, etc.), transforming and scoring the sampled transactions, and providing the results of the scoring. These results may include an indication of how many transactions were tested, how may "failed" the scoring process (e.g., auto-fail, filed to meet a minimum total score, etc.), an indication of the average score for the tested transactions, etc. Such testing may enable fine-tuning of the rubric before general use.

Figure 6:
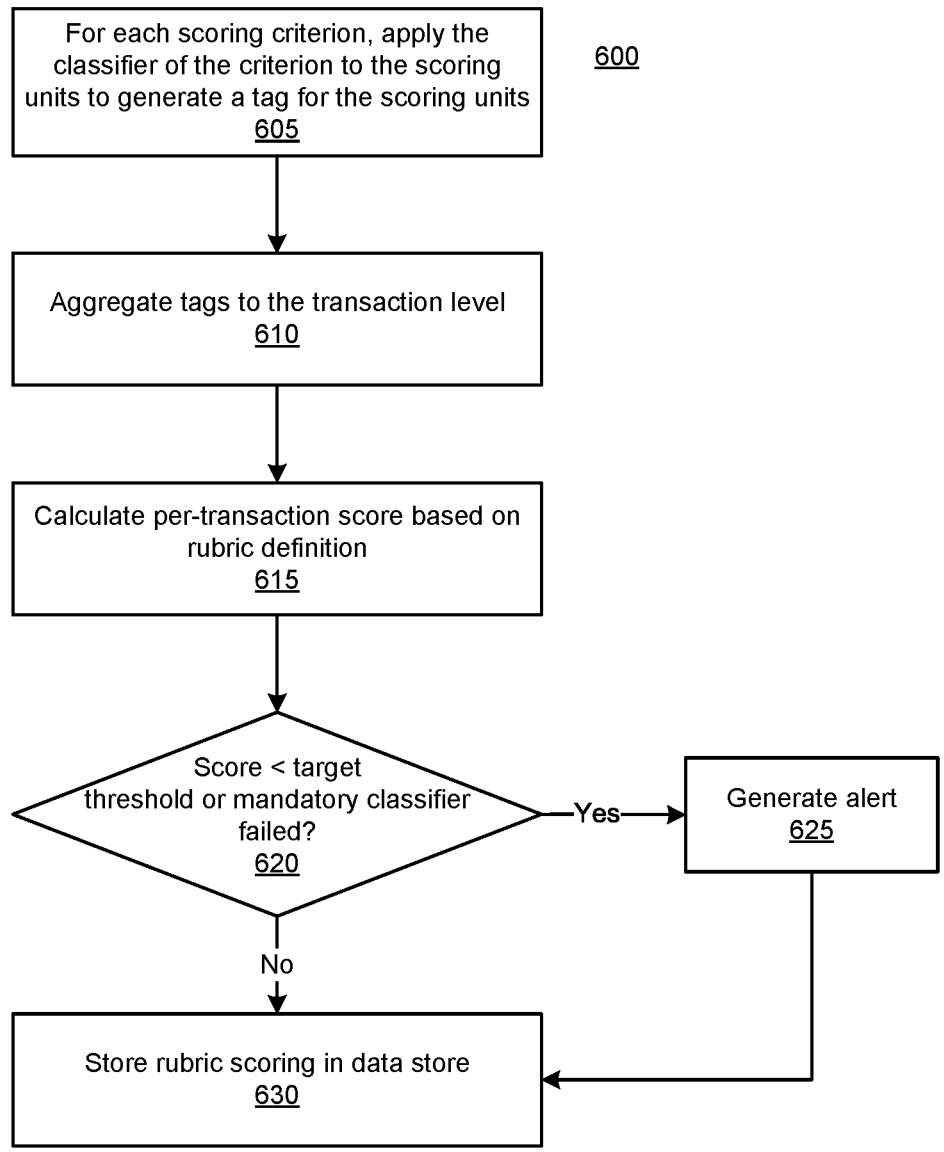
FIG. 6 is a flow diagram illustrating an example process for applying a classifier library in accordance with a customized rubric, according to an implementation.

FIG. 6 is a flow diagram illustrating an example process 600 for applying a classifier library and scoring a transaction in accordance with a customized rubric, according to an implementation. In some implementations, process 600 may be performed as part of process 300 of FIG. 3. In some implementations, steps 605, 610, and 615 may be performed as part of step 320 of FIG. 3. In some implementations, step 620 may be performed as part of step 325 of FIG. 3. In some implementations, step 625 may be performed as part of step 330 of FIG. 3. In some implementations, step 630 may be performed as part of step 345 of FIG. 3. Process 600 begins by applying the classifiers associated with the rubric scoring criteria to the scoring units of the transaction (605). Each rubric scoring criterion identifies a category, which corresponds to a classifier and the tag or tags generated by the classifier. As illustrated in FIG. 5, a rubric may include a plurality of categories, each one corresponding to a scoring criterion. Applying the classifier to a scoring unit may result in generation of a tag for the scoring unit. Tags may be explicit. For example, in some implementations, the system may generate a label for the category indicating the result of the classifier, e.g., the label indicating either profanity found or profanity not found. Tags may include implicit tags. For example, in some implementations, the system may generate a tag for a binary classifier if a characteristic is found but not if the characteristic is not found. A binary classifier indicates either presence or absence of a characteristic. For instance, if the classifier looks for the presence of profanity, the system may label the scoring unit with a profanity tag if profanity is found by the classifier but may not label the scoring unit if profanity is not found. The system applies each classifier represented in the rubric scoring criteria to the scoring units of the transaction. If the rubric scoring criteria includes branching criteria, in some implementations, the system may not apply the criteria within the branch unless the branching condition is satisfied.

In some implementations, the system may aggregate tags up to the transaction level (610). Aggregation may be based on a hierarchy. For example, multiple basic (e.g., sentence) scoring units may aggregate to an intermediate level, such as a paragraph, a verbatim, etc. Multiple intermediate levels may aggregate to higher levels, up to the transaction level.

The system may aggregate the tags represented by the scoring units to the intermediate level scoring unit (e.g., paragraph or verbatim) level, which may result in the system adding tags to the intermediate level scoring unit. Aggregation of binary tags (e.g., presence or absence of a characteristic) may include labeling the intermediate level scoring unit (e.g., paragraph, verbatim, etc.) with an indication of the presence of the characteristic if any scoring units in the aggregate include the presence of the characteristic. Aggregation of non-binary tags may include averaging tag values. For example, an emotional intensity tag may include a confidence value, which indicates a level of confidence that an emotion is present and is intense. In some implementations, the intensity may be based on a numeric scale. For example, on a scale of 1-5, a scale of 1-99, etc., with lower confidence indicating lower intensity. To aggregate such tags, the system may average the confidence values over scoring units having the emotional intensity tag. Aggregation is repeated for higher levels, with a highest level being the transaction.

The system may calculate a transaction level score based on the tag values and weights assigned in the rubric scoring criteria (615), including calculating linked and branching criteria. Calculating the transaction level score may include determining, for each scoring criterion, whether the transaction satisfies the criterion condition. When the condition indicates a tag should be "present" or "detected", a transaction satisfies the condition when the tag exists or when the tag indicates the characteristic exists. When the condition indicates a tag (category) is "not detected," "absent," etc., a transaction satisfies the condition when the tag does not exist, or when the tag exists but indicates the characteristic is absent. Determining whether the transaction satisfies the condition may include aggregating some criterion. For example, linked criteria may have scores summed, averaged, etc., to the group level. Branching criteria may be scored one way if the branch criteria is met and another way if not met.

In some implementations, the system may determine whether any of the rubric scoring criteria includes an auto-alert outcome or whether the score for the transaction fails to meet a target score (620). A mandatory classifier rule is one with an alert condition (e.g., auto-fail) outcome attribute. A tag for a mandatory classifier must be present in the transaction or the transaction triggers an alert (625). In some implementations, a transaction with a score that fails to meet a threshold score may also trigger an alert (625). The alert can be any notification to a user that identifies the transaction. In some implementations this may include putting the transaction in an alert queue. In some implementations, this may initiate a workflow. The system may store the outcome of scoring, e.g., the aggregated scores, in a data store (630), i.e., a repository of scored transactions. The repository of scored transactions may be used in dashboard and/or trend reporting.

FIG. 7 is a diagram illustrating an example interface 700 for viewing an alert queue, according to an implementation. The example user interface 700 of FIG. 7 provides an example of an alert queue generated for the call center agent compliance rubric of FIG. 5 and is presented for illustration purposes only; implementations are not limited to call center rubrics or to the specific scoring criterion illustrated. User interface 700 demonstrates a novel interface for organizing and identifying issues that affect operations and may require coaching or training. The user interface 700 may include an alert list 705. The alert list includes a transaction summary, including a title 710, a snippet 715 of text from the transaction, and tags 720 for the transaction. The list 705 can be sorted in any number of ways using sorting control 725. For example, transactions in the list 705 may be sorted by date, by title, or by any other available fields. The user interface 700 may also include an intelligent filing system, represented by smart folders 750

FIG. 8 is a diagram illustrating an example alert coaching interface 800, according to an implementation. The example interface 800 of FIG. 8 illustrates one example of how implementations provide novel tools for collaboration and training related to potentially problematic transactions. In some implementations, the interface 800 may be initiated by selection of an alert from an alert queue, e.g., selection of one of the transactions in list 705 of interface 700. The interface 800 includes information identifying the transaction 805. This information may include a title of the transaction, an agent associated with the transaction, a timestamp, etc. In the specific example of FIG. 8, the interface includes a call playback control 810. The call playback control 810 enables agents and managers to listen to audio, from which the transcribed text used to score the transaction was generated. This enables agents and managers to more quickly verify disputed tags, as transcribed text may not convey as much information as the audio (e.g., due to incorrectly transcribed text, sarcasm, etc.). The interface 800 may also include a call summary 815 and a current case status 820. The interface 800 may also include a control 825 for updating the case status.

The interface may include call metadata 830. The call metadata 830 section may include transaction metadata, e.g., identifying the agent involved in the transaction and the supervisor of the agent. The call metadata 830 section may display metadata regarding the rubric scoring criteria for this transaction, e.g., an indication of which categories were met, e.g., if the tag value is 'detected' and the tag was detected for the transaction the category is met. Likewise, if the tag value is 'not detected' and the tag was detected, the category is not met, and the value would show on interface 800 as a zero. The call metadata 830 section may also include the overall score calculated for the transaction. The call metadata 830 section provides transparency into the scoring process by coherently and efficiently presenting the underlying data that justifies the score. The interface 800 facilitates identification of issues, investigation of outliers and a platform of collaboration for addressing issues and outliers. For example, interface 800 may include coaching note history 835. Coaching notes may represent messages between the agent and supervisor regarding the transaction. The coaching note history 835 enables the parties to discuss improvements and document solutions in the context of the metadata 830. Additional coaching notes may be accessed, e.g., via control 840.

FIG. 9 is a diagram illustrating an example agent dashboard, according to an implementation. The example interface 900 of FIG. 9 illustrates one example of a trend dashboard supported by disclosed implementations. In the example of FIG. 9, the dashboard illustrates a 30-day trend for transactions associated with a particular agent. The agent associated with a transaction is one example of a transaction attribute, or transaction metadata. However, implementations are not limited to displaying trends for an agent; implementations include a dashboard interface that displays transaction trends based on any attribute of a transaction, e.g., time, source, hashtag identified in the transaction text, etc. In some implementations, the system may provide a transaction attribute selection control, which enables the user to select a transaction attribute and attribute value that the dashboard interface uses to aggregate transactions matching the selected attribute value over a trend period.

The interface 900 includes a trend score 905. A trend score is an aggregation of scored transactions over some time period, e.g., over an hour, a day, a week, etc. A trend score can be generated for transactions meeting some selection criteria, e.g., all scored transactions, scored transactions for a particular agent, scored transactions from a particular source, scored transactions relating to a particular product, etc. The trend score 905 of interface 900 is an aggregation of the scored transactions for the agent that have occurred in the last 30 days. The aggregation can be an average score of the transactions for the agent, a mean score for the transactions for the agent. In some implementations, the trend score can include other aggregations, such as quartiles, a minimum score, a maximum score, etc. The interface 900 may also include a trend graph 910. The trend graph 910 illustrates an aggregate of transactions for the agent by day, e.g., each data point representing a day in the last 30 days for which the agent has a transaction. The trend graph 910 may plot transaction scores by day, aggregating all transactions for the agent that occur on the same day. Some implementations may use other aggregation periods, e.g., plotting every-two days, every week, every 4 hours, etc. In general, a trend graph breaks the trend score into smaller aggregations over the trend period, e.g. showing daily aggregations over a two week trend period, showing hourly aggregations over a daily trend period, etc.

The interface 900 includes category summaries 915. The category summaries 915 may represent, for those categories included in the rubric scoring criteria, an average of the tag values over the trend period. For categories representing tag values of detected (present) or not detected (absent), the value may be a one if the condition is met and zero if the condition is not met, as discussed above with regard to FIG. 8. In this case, a value of 1 may be considered 100% category criteria met, and the aggregate value in the category summaries 915 may thus represent a percentage of the time the category was met over the trend period. Although not illustrated in FIG. 9, a category that has a non-binary value, such as emotional intensity, may display a proportion in the category summary. For example, emotional intensity may have a value of low, medium, and high. For a category summary the system may calculate a proportion of the transactions that had a low intensity, a proportion of the transactions that had a medium intensity, and a proportion of transactions that have high intensity. Depending on the implementation, transactions lacking a low, medium, or high tag for emotional intensity may be excluded from the summary or may be included in the proportion denominator.

FIG. 10 is a diagram illustrating an example supervisor dashboard, according to an implementation. The example interface 1000 of FIG. 10 illustrates one example of a trend summary dashboard supported by disclosed implementations. In the example of FIG. 10, the trend summary dashboard illustrates a 7-day trend for transactions associated with agents under a particular supervisor. In some implementations, the trend period may be selectable, e.g., so that the supervisor can change the trend period from 7 days to 14 days, 30 days, etc. Implementations are not limited to displaying trends for agents; implementations include a dashboard interface that displays transaction trends based on any attribute of a transaction, e.g., time, source, hashtag identified in the transaction text, etc. In some implementations, the system may provide a transaction attribute selection control, which enables the user to select a transaction attribute, and the dashboard interface aggregate transactions by attribute value over a trend period (e.g., by agent, by hashtag, by product, etc.). Implementations may also enable selection of other transaction attributes to further limit which transactions are included, e.g., selecting a specific supervisor and aggregating transactions for agents under the supervisor, selecting a specific data source and aggregating transactions by topic from that data source, selecting a topic and aggregating by hashtag within that topic, etc.

The interface 1000 includes a summary box 1005 that lists, for each agent over the trend period, overall statistics for the agent. The interface 1000 includes as overall statistics for an agent a number of transactions scored for the agent during the trend period (volume) and an aggregate score (trend score) for the agent over the trend period. The interface may enable sorting the data in the summary box 1005 by agent, by volume, or by trend score.

The interface 1000 also includes a trend graph 1010. The trend graph 1010 may be similar to trend graph 910 but may include a graph line for each agent. The interface 1000 also includes category summary boxes 1015. The category summary boxes 1015 illustrate aggregate category scores by agent over the trend period. The aggregate category scores are similar to the category summaries 915 of FIG. 9. Interface 1000 provides a manager or supervisor with a concise view of how different agents are performing and which categories might be causing issues. Thus, interface 1000 provides insights into training issues, potential personnel problems, and important metrics, all customized to the particular environment. The interface 1000 operates in real-time, giving the manager insight into emerging trends as they happen. While interfaces 900 and 1000 are illustrated in the context of a call center, similar trend dashboards can be implemented in other settings, e.g., tracking public reaction to an event, to an ad campaign, a movie, etc.

FIG. 11 is a diagram illustrating an example record in a transaction scoring data structure 1100, according to an implementation. In the example of FIG. 11, a transaction has three hierarchy levels. A highest level is the document 1105, which represents the transaction. A document 1105 has one or more verbatims 1110 as an intermediate level in the hierarchy. A verbatim 1110 represents everything attributed to one speaker during a turn. In other words, in a conversation with two speakers, the speakers take turns speaking. Each turn is a verbatim. Put another way, a question by speaker 1 is a first verbatim, the answer by speaker 2 is a second verbatim, and a follow-on question from speaker 1 is a third verbatim, etc. A transaction may have more than three speakers. For example, a social media post may have one speaker and comments to the post may be additional speakers. Some transactions may have a paragraph as the intermediate level in the hierarchy. Some transactions may not have an intermediate level in the hierarchy. A lowest level of the hierarchy is a sentence 1115. Each verbatim 1110 may have one or more sentences 1115. For each sentence 1115 represents a basic scoring unit. For each sentence 1115 the data structure 1100 tracks the verbatim that the sentence belongs to. The data structure 1100 additionally includes metadata generated by a transformation system, such as a language, verbatim type, etc. The data structure 1100 may also include the text included in the sentence 1115 and any tags associated with the sentence 1115. Similarly, the data structure 1100 may include metadata for the verbatim 1110 and metadata from the document 1105.

Figure 12:
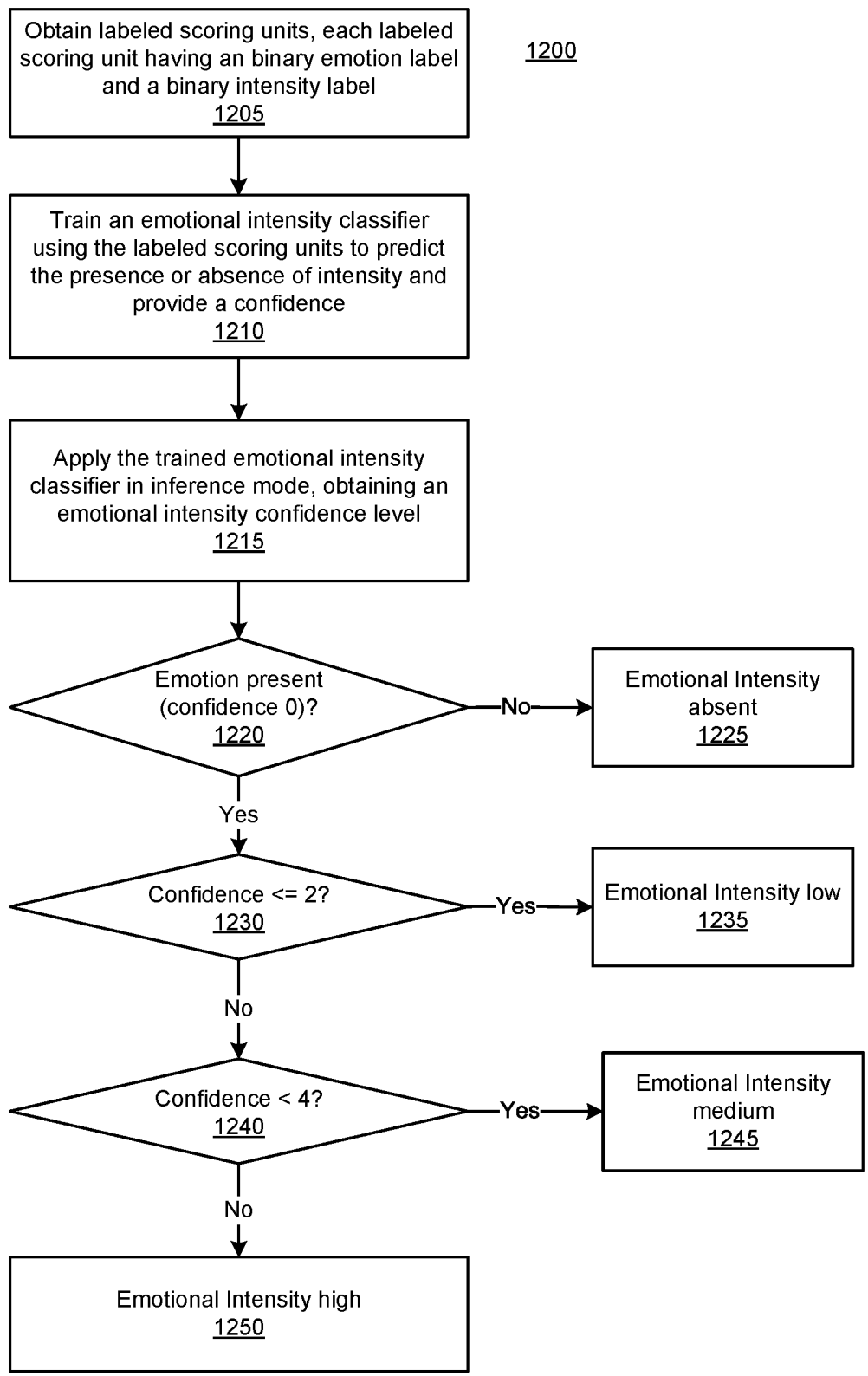
FIG. 12 is a flow diagram illustrating an example process for training and using an emotional intensity classifier, according to an implementation.

FIG. 12 is a flow diagram illustrating an example process 1200 for training and using an emotional intensity classifier, according to an implementation. Process 1200, or parts thereof, may be performed by an intelligent scoring system, such as system 100 of FIG. 1. Process 1200 can also be performed by another computer system independent of an intelligent scoring system, e.g., used to tag scoring units for some other purpose. Process 1200 begins with obtaining training data for the emotional intensity classifier (1205). The training data is labeled scoring units, e.g., sentences, verbatims, paragraphs, etc. The labels may be hand curated. In other words, a human may provide the labels. The labels include an emotion label that indicates either the presence of an emotion in the scoring unit or the absence of an emotion in the scoring unit. The emotion itself may not be labeled, just the presence or absence of an emotion. If the emotion label indicates the presence of an emotion, then the user may provide an intensity label. The intensity label indicates the scoring unit either reflects emotional intensity or does not reflect emotional intensity. The labels may be represented in binary fashion, e.g., a 1 to represent presence of an emotion and a 1 to represent intensity and a zero to represent the absence of these characteristics.

Once sufficient training data is obtained, the emotional intensity classifier may be trained using the training data (1210). The emotional intensity classifier may be any machine-learned classifier, e.g., logistic regression, support vector machine, etc. The emotional intensity classifier may be trained to output the correct labels (e.g., emotion/no emotion and intensity/no intensity) given the scoring units as input. In addition to providing predicted labels, the emotional intensity classifier may provide a confidence level regarding the labels. The confidence level represents the likelihood that the intense label is correct. This confidence level may be used to interpret the scoring unit as low intensity, medium intensity, or high intensity. For example, if the confidence level is a value in the range of 1 to 5, a value of 3 or below may be interpreted as low intensity, a value of 4 or above may be interpreted as high intensity, and everything else as medium intensity. Similarly, a confidence level ranging between 0 and 1 may be interpreted as low intensity if 0.33 or below, as high intensity if 0.66 or above, and medium intensity otherwise. In some implementations, the confidence level is kept as the emotional intensity tag value. In some implementations a value representing low, medium, or high is kept as the tag value. In some implementations, a separate tag is used, e.g., one tag representing low intensity (which is either present or absent), a tag representing medium intensity, and a tag representing high intensity. In some implementations, steps 1205 or 1210 may be performed on another system and the trained classifier imported to a system that uses the classifier, such as the intelligent scoring system.

Once trained, the emotional intensity classifier may be used in inference mode, for example by the intelligent scoring system or another computer system. In inference mode, the emotional intensity classifier is applied to scoring units to obtain an emotional intensity confidence level (1215). As indicated earlier, the confidence level may be used to determine whether a scoring unit has high, medium, or low intensity, or no intensity. For example, if the classifier indicates no emotion is present (1220, No), the scoring unit lacks intensity (1225). This may result in no tag generated for the scoring unit. Alternatively, an intensity tag of zero may be associated with the scoring unit. If an emotion is present (1220, Yes), a system may use the confidence level to determine emotional intensity. In one example where the confidence is represented on a scale of 1 to 5 (with 5 being most confident), a system may interpret a confidence of 2 or less (1230, Yes) as falling within a low range and the system may consider the emotional intensity to be low intensity (1235). If the confidence is greater than 2 (1220, No) but less than 4 (1240, Yes), a system may consider the emotional intensity to be medium (1245). A confidence greater than or equal to 4 (1240, No) may be considered to fall in a high range and the system may consider the emotional intensity to be high intensity. A confidence level that does not fall in the low range and does not fall in the high range may be considered to fall in a medium range.

As indicated above, an emotional intensity classifier may be used outside of a rubric. For example, a system may use the emotional intensity classifier to identify the most common words used in various sources (e.g., social media posts or online reviews) that exhibit high intensity. Because such a system can analyze millions of such individual transactions in a short period of time, the system can provide early insight into potential problem, as well as identify effective actions (e.g., effective advertising, workflow, website design, etc.).

Implementations can be used in various kinds of settings and to provide more robust, efficient, and effective analysis tools to help an organization manage and address trends. For example, during a global pandemic, industries and societal institutions are completely upended and eager to understand when things can return to a new normal. While there is no survey or streamlined way to solicit consumer opinions, the public does express their perspectives online, e.g., via social media posts. Implementations can analyze specific indicators in these posts, such as emotion, sentiment, intensity, profanity and more, to quantify public perceptions and provide a trend analysis that provides insight on the timing of a return to a new, stable baseline. Implementations can enable an entity to set up a rubric that is applied to social media posts about a topic or topics. Implementations can then provide a general dashboard indicating the emotions, emotion intensity, etc., which offers insight not otherwise available. As another example, implementations provide a source agnostic and unifying platform to score transactions across all listening posts. For example, rubric scoring can be applied to social outlets, calls, chats, emails, and surveys.

As another example, fraudulent claims and scams can cost organizations exorbitant amounts of time and money. Disclosed implementations can identify telltale signs of fraudulent activity, for example via a rubric that detects fraudulent language in an interaction (transaction). By detecting these clues from text or from structured data from various sources, then weighting them by strength, organizations can alert relevant parties about potential fraud in real time and address it before it manifests into actual losses. As another example, injuries or illnesses incurred at a company's property can result in financial and legal damages for an organization. Customer feedback may include commentary about specific hazards or risks that affected their experience. By detecting mentions of such hazards, e.g., in customer reviews or social media posts, and weighting them respectively to their relative risks, organizations can rank relative health and safety risk of specific spaces and prioritize fixing them before they cause harm to customers or employees. As another example, an upsell effort may land of deaf ears if the candidate is not in a position or not interested in increased spending with an organization. Implementations can enable a system to score potential candidates by upsell-ability using specific indicators of purchasing power or product interest. As another example, contact centers can face fines for inaccurate or missing legal disclosure statements, proper verification or handling of sensitive data. Contact centers that rely on manual processes only evaluate a small sample of interactions to identify whether these statements may have been articulated correctly. Disclosed implementations provide an automated mechanism to check for specific violations and rank those that are most egregious in 100% of contacts, which results in much better compliance.

The applicability of implementations to these diverse problems demonstrates the improvement of disclosed implementations to the field of data analytics, and not to any one particular activity or business setting. Implementations also provide a novel system for objectively scoring problems previously subject to subjective and opaque judgments.

Methods discussed above may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, be embodied in many alternate forms and should not be construed as limited to only the embodiments set forth herein.

It can be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term "and/or" includes any and all combinations of one or more of the associated listed items.

It can be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments only and is not intended to be limiting of example embodiments. As used herein, the singular forms "a," "an" and "the" are intended to include the plural forms as well, unless the context clearly indicates otherwise. It can be further understood that the terms "comprises," "comprising," "includes" and/or "including," when used herein, specify the presence of stated features, integers, steps, operations, elements and/or components, but do not preclude the presence or addition of one or more other features, integers, steps, operations, elements, components and/or groups thereof.

Unless otherwise defined, all terms (including technical and scientific terms) used herein have the same meaning as commonly understood by one of ordinary skill in the art to which example embodiments belong. It can be further understood that terms, e.g., those defined in commonly used dictionaries, should be interpreted as having a meaning that is consistent with their meaning in the context of the relevant art and cannot be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as "processing" or "computing" or "calculating" or "determining" of "displaying" or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of non-transitory program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fiber, or some other suitable transmission medium known to the art. The example embodiments are not limited by these aspects of any given implementation.

Lastly, it should also be noted that while particular combinations of features described herein, the scope of the present disclosure is not limited to the particular combinations, but instead extends to encompass any combination of features or embodiments herein disclosed irrespective of whether or not that particular combination has been specifically enumerated.

In one aspect, a system for intelligently scoring transactions from a data source includes at least one processor, memory storing a library of classifiers, and memory storing instructions that, when executed by the at least one processor, causes the system to provide a user interface configured to generate a rubric, store the rubric in a data store, provide a scoring engine configure to apply the stored rubric to scoring units of a transaction to generate a score for the transaction, and provide a dashboard interface that displays a trend score, the trend score being an aggregate of scores for transactions occurring during a trend period. The user interface generates a by receiving selection of one or more scoring conditions, each scoring condition identifying a tag generated by a classifier in the library of classifiers and, for each identified tag, receiving selection of a value for the tag that satisfies the scoring condition and receiving selection of an outcome attribute for the scoring condition.

These and other aspect may include one or more of the following, alone or in combination. For example, the outcome attribute may include a weight, the weight being used to generate the score for a transaction when the transaction satisfies the scoring condition. As another example, the outcome attribute may include an alert condition. In some implementations, the scoring engine is further configured to place a transaction that meets the alert condition on an alert queue and the system further comprises memory storing instructions that, when executed by the at least one processor, cause the system to provide an alert interface. The alert interface may be configured to, for a set of transactions in the alert queue: display an identifier for each transaction in the set of transactions, display a snippet from each transaction in the set of transactions, and display, for each transaction in the set of transactions, tags generated for the transaction by application of the scoring engine.

As another example, at least one classifier in the library of classifiers may be a rule-based classifier defined by a user. In some implementations, the user interface may be further configured to receive the rule-based classifier from a user, wherein receiving the rule-based classifier includes receiving a particular condition, the rule-based classifier testing for presence or absence of the particular condition in the transaction, and receiving a tag for the rule-based classifier. As another example, the value for the tag may include an indication of presence of the tag or an indication of absence of the tag. As another example, the library of classifiers may include an emotional intensity classifier, wherein a tag generated by the emotional intensity classifier is based on a confidence in a prediction that a scoring unit includes an intense emotion. As another example, the user interface may be further configured to receive rubric selection criteria that is used to select transactions from data sources. As another example, the dashboard interface may be further configured to display a trend graph, the trend graph breaking the trend score into smaller aggregations over the trend period. As another example, the trend score may be a first trend score and the dashboard interface is further configured to display a trend score for each of at least two attribute values of a transaction attribute, wherein the first trend score is for one of the at least two attribute values. In some implementations, the dashboard interface is further configured to display a trend graph for each trend score, the trend graph breaking the trend score into smaller aggregations over the trend period and/or receive a selection of the transaction attribute from a user. As another example, the user interface may be further configured to receive a group label from a user and enable linking of two or more tags under the group label, wherein the two or more tags each receives a weight as the outcome attribute and wherein a weight for the group label is an aggregate of the weights for the two or more tags. As another example, the user interface may be further configured to receive an indication that one of the selected tags is a branching criterion and enable linking of two or more tags under the branching criterion.

According to one aspect, a method includes generating a repository of scored transactions by, for each transaction of a plurality of transactions, determining that a customized rubric applies to the transaction based on selection criteria for the customized rubric, the customized rubric including scoring criteria, the scoring criteria identifying a plurality of tags, each tag being a tag generated by a classifier from a library of classifiers and at least some of the tags having a weight associated with a tag value, and for each scoring unit of the transaction, applying the classifiers associated with the plurality of tags to the scoring unit, wherein applying the classifiers labels the scoring unit with tags. Generating the repository of scored transactions method may also include aggregating the tags of the scoring unit to generate transaction level tags, calculating a transaction score based on the transaction level tags and the scoring criteria, and storing the transaction score and the transaction level tags in the repository. The method may also include displaying a dashboard that includes a trend score, the trend score being an aggregate of transaction scores for transactions occurring during a trend period. In some implementations, the library of classifiers may include rule-based classifiers provided by a user. In some implementations the transactions include social media posts and the transaction scores are calculated in real-time.

These and other aspects can include one or more of the following, alone or in combination. For example, the scoring criteria may specify an alert condition. The alert condition may cause data to be added to a data store and/or may initiate a workflow and/or may place a transaction that meets the alert condition on an alert queue. In some implementations the method may include providing an alert interface configured to, for a set of transactions in the alert queue: displaying an identifier for each transaction in the set of transactions, displaying a snippet from each transaction in the set of transactions, and displaying, for each transaction in the set of transactions, tags generated for the transaction by application of the scoring engine.

As another example, the tag value may include an indication of presence of the tag or an indication of absence of the tag. As another example, the library of classifiers may include an emotional intensity classifier, wherein a tag generated by the emotional intensity classifier is based on a confidence in a prediction that a scoring unit includes an intense emotion. As another example, the method may also include receiving rubric selection criteria and using the rubric selection criteria to select transactions to be included in the repository of scored transactions from data sources. As another example, the method may also include displaying a trend graph, the trend graph breaking the trend score into smaller aggregations over the trend period. As another example, the scoring criteria may include a branching criterion. As another example, the scoring criteria may include a group of linked criteria.

According to one aspect, a method includes obtaining labeled scoring units, each labeled scoring unit being labeled as including an emotion or not including an emotion and for scoring units labeled as including an emotion, being labeled as reflecting emotional intensity or not reflecting emotional intensity, training, using the labeled scoring units, a machine-learned classifier to predict an emotional intensity label, using the trained machine-learned classifier to predict an emotional intensity label for a new transaction scoring unit, the prediction including a confidence level, and adding an emotional intensity tag to the scoring unit based on a value of the confidence level.

These and other aspects may include one or more of the following, alone or in combination. For example, adding an emotional intensity tag to the scoring unit based on a value of the confidence level may include adding a low intensity tag to the scoring unit when the confidence level falls in a low range, adding a high intensity tag to the scoring unit when the confidence level falls in a high range, and adding a medium intensity tag to the scoring unit when the confidence level falls outside the low range and the high range. As another example, the machine-learned classifier is one classifier of a plurality of classifiers in a library and the method may also include providing a user interface configured to generate a rubric. The user interface may be configured to generate the rubric by receiving selection of one or more scoring conditions, each scoring condition identifying a tag generated by a classifier in the library of classifiers, at least one of the one or more scoring conditions identifying the emotional intensity tag, for each identified tag, receiving selection of a value for the tag that satisfies the scoring condition, and for at least some of the selected tags, receiving a weight for the tag. The method may also include applying the rubric to scoring units of a plurality of transactions, wherein applying the rubric to a transaction of the plurality of transactions generates a score for the transaction; and displaying a trend score, the trend score being an aggregate of scores for transactions occurring during a trend period.

As another example, the method may also include using the trained machine-learned classifier to predict an emotional intensity label for a plurality of transaction scoring units to identify a set of transaction scoring units reflecting emotional intensity that also have a confidence level that falls in a high range, and storing the set of transaction scoring units for analysis. In some implementations, the analysis may include identifying, from the set of transaction scoring units, a set of most-occurring words. In some implementations, the transaction scoring units may be social media posts and/or reviews. In some implementations, the analysis includes initiating a workflow for reviewing the transaction scoring units.

In another aspect, a non-transitory computer-readable medium stores instructions that, when executed by at least one processor, causes a computing system to perform any of the methods or processes disclosed herein.

What is claimed is:

1. A method comprising:
    generating a repository of scored transactions by, for each transaction of a plurality of transactions:
        determining that a customized rubric applies to the transaction based on selection criteria for the customized rubric, the customized rubric including scoring criteria, the scoring criteria identifying a plurality of tags, each tag being a tag generated by a classifier from a library of classifiers and, for at least some of the plurality of tags, identifying a weight associated with a tag value,
        for each scoring unit of the transaction, applying the classifiers associated with the plurality of tags to the scoring unit, wherein applying the classifiers labels the scoring unit with tags,
        aggregating the tags of the scoring unit to generate transaction level tags,
        calculating a transaction score based on the transaction level tags and the scoring criteria, and
        storing the transaction score and the transaction level tags in the repository; and
    displaying a dashboard that includes a trend score, the trend score being an aggregate of transaction scores for transactions occurring during a trend period.

2. The method of claim 1, wherein the transactions include social media posts and the transaction scores are calculated in real-time.

3. The method of claim 1, wherein each tag identifies a respective value for the tag that satisfies the criteria.

4. The method of claim 3, wherein the respective value for a tag includes an indication of presence of the tag or an indication of absence of the tag.

5. The method of claim 1, wherein at least one classifier is a rule-based classifier defined by a user.

6. The method of claim 5, wherein the rule-based classifier includes a tag defined by the user and includes a particular condition, the rule-based classifier being configured to test for presence or absence of the particular condition in the transaction.

7. The method of claim 1, wherein for one tag with an associated weight of the at least some of the plurality of tags, calculating the transaction score includes:
    determining whether a value for the tag satisfies a scoring criterion for the tag, the value for the tag being determined by application of the classifiers and the scoring criterion being one of the scoring criteria; and
    responsive to determining that the value for the tag satisfies the scoring criterion, using the weight during calculation of the transaction score.

8. The method of claim 7, wherein the value for the tag includes an indication of presence of the tag or an indication of absence of the tag.

9. The method of claim 1, wherein the library of classifiers includes an emotional intensity classifier, wherein a tag generated by the emotional intensity classifier is based on a confidence in a prediction that a scoring unit includes an intense emotion.

10. The method of claim 1, wherein the selection criteria identifies an attribute of the plurality of transactions, wherein the customized rubric applies to the transaction when the transaction includes the attribute.

11. The method of claim 1, further comprising:
    displaying a trend graph, the trend graph breaking the trend score into smaller aggregations over the trend period.

12. The method of claim 1, wherein calculating the transaction score includes:
    determining that a scoring criterion of the scoring criteria has a branching condition as an outcome;
    determining whether the scoring criterion is satisfied by the transaction; and
    in response to determining that the scoring criterion is satisfied, applying an additional scoring criterion to the transaction, wherein the additional scoring criterion is not applied in response to determining that the scoring criterion is not satisfied.

13. A system comprising:
    at least one processor;
    a library of classifiers;
    a repository of scored transactions; and
    memory storing instructions that, when executed by the at least one processor, cause the system to perform operations including, for each transaction of a plurality of transactions:
        determining that a customized rubric applies to the transaction based on selection criteria for the customized rubric, the customized rubric including scoring criteria, the scoring criteria identifying a plurality of tags, each tag being a tag generated by a classifier from the library of classifiers and, for at least some of the plurality of tags, identifying a weight associated with a tag value, for each scoring unit of the transaction, applying the classifiers associated with the plurality of tags to the scoring unit, wherein applying the classifiers labels the scoring unit with tags, aggregating the tags of the scoring unit to generate transaction level tags, calculating a transaction score based on the transaction level tags and the scoring criteria, and storing the transaction score and the transaction level tags in the repository.

14. The system of claim 13, wherein the transactions include social media posts and the transaction scores are calculated in real-time.

15. The system of claim 13, wherein the operations further include:

determining a trend score, the trend score being an aggregate of transaction scores for transactions occurring during a trend period; and triggering an alert when the trend score satisfies an alert condition.

16. The system of claim 13, wherein each tag identifies a respective value for the tag that satisfies the criteria.

17. The system of claim 16, wherein the respective value for a tag includes an indication of presence of the tag or an indication of absence of the tag.

18. The system of claim 13, wherein at least one classifier in the library of classifiers is a rule-based classifier defined by a user.

19. The system of claim 18, wherein the rule-based classifier includes a tag defined by the user and includes a particular condition, the rule-based classifier being configured to test for presence or absence of the particular condition in the transaction.

20. The system of claim 14, further comprising:

displaying a trend graph, the trend graph displaying an aggregate of transaction scores for transactions occurring during a trend period.

* * * * *